US009660995B2

(12) United States Patent
Reiter et al.

(10) Patent No.: US 9,660,995 B2
(45) Date of Patent: May 23, 2017

(54) METHODS, SYSTEMS, AND COMPUTER READABLE MEDIA FOR COMBATING DEVICE THEFT WITH USER NOTARIZATION

(71) Applicants: The University of North Carolina at Chapel Hill, Chapel Hill, NC (US); Indiana University Research and Technology Corporation, Indianapolis, IN (US)

(72) Inventors: Michael Kendrick Reiter, Chapel Hill, NC (US); Apu Chandrasen Kapadia, Bloomington, IN (US); Alana Libonati, Carrboro, NC (US)

(73) Assignees: The University of North Carolina at Chapel Hill, Chapel Hill, NC (US); Indiana University Research & Technology Corporation, Indianapolis, IN (US)

( * ) Notice: Subject to any disclaimer, the term of this patent is extended or adjusted under 35 U.S.C. 154(b) by 0 days.

(21) Appl. No.: 14/769,160

(22) PCT Filed: Feb. 20, 2014

(86) PCT No.: PCT/US2014/017375
§ 371 (c)(1),
(2) Date: Aug. 20, 2015

(87) PCT Pub. No.: WO2014/130663
PCT Pub. Date: Aug. 28, 2014

(65) Prior Publication Data
US 2015/0381624 A1  Dec. 31, 2015

Related U.S. Application Data

(60) Provisional application No. 61/767,226, filed on Feb. 20, 2013.

(51) Int. Cl.
*H04L 9/32* (2006.01)
*H04L 29/06* (2006.01)
(Continued)

(52) U.S. Cl.
CPC .............. *H04L 63/10* (2013.01); *G06F 21/31* (2013.01); *G06F 21/6245* (2013.01);
(Continued)

(58) Field of Classification Search
CPC ..... H04L 63/10; H04L 63/0428; G06F 21/31; G06F 21/6245; G06F 21/88; H04N 7/141
See application file for complete search history.

(56) References Cited

U.S. PATENT DOCUMENTS 7,028,184 B2 *  4/2006  Hind ..................... H04L 9/3236
                                                       380/201
7,660,988 B2 *  2/2010  Carmichael ............ G06Q 10/10
                                                       380/255
(Continued)

FOREIGN PATENT DOCUMENTS

JP    2003-263519 A    9/2003
JP    2010-257060 A    11/2010
(Continued)

OTHER PUBLICATIONS

Notification of Transmittal of the International Search Report and the Written Opinion of the International Searching Authority, or the Declaration for International Application No. PCT/US2014/017375 (May 29, 2014).
(Continued)

*Primary Examiner* — Taghi Arani
*Assistant Examiner* — Sharon Lynch
(74) *Attorney, Agent, or Firm* — Jenkins, Wilson, Taylor & Hunt, P.A.

(57) ABSTRACT

The subject matter described herein includes methods, systems, and computer readable media for combating mobile
(Continued)

device theft with user notarization. One method includes providing a supplicant video notarization system application executable on a supplicant device for initiating an interactive video call between a supplicant and a notary as a condition to the supplicant accessing a protected electronic resource. The method further includes providing a notary video notarization system application executable on a notary device through which the notary receives the interactive video call and interacts with the supplicant via the interactive video call to confirm the identity of the supplicant and that video of the supplicant provided in the call is live.

27 Claims, 8 Drawing Sheets

(51) Int. Cl.
G06F 21/31 (2013.01)
G06F 21/62 (2013.01)
G06F 21/88 (2013.01)
H04N 7/14 (2006.01)

(52) U.S. Cl.
CPC .......... *G06F 21/88* (2013.01); *H04L 63/0428* (2013.01); *H04N 7/141* (2013.01)

(56) References Cited

U.S. PATENT DOCUMENTS

| | | | | |
|---|---|---|---|---|
| 7,934,098 B1* | 4/2011 | Hahn | G06F 21/64 | 713/176 |
| 8,190,904 B2* | 5/2012 | Hatter | G06Q 20/02 | 713/178 |
| 8,250,632 B1* | 8/2012 | Staddon | G06F 17/30867 | 705/319 |
| 8,316,086 B2* | 11/2012 | Ufford | G06Q 10/107 | 705/319 |
| 8,346,217 B2* | 1/2013 | Crawford | H04W 12/06 | 455/410 |
| 9,049,027 B2* | 6/2015 | Etheridge | H04L 9/3247 | |
| 9,166,986 B1* | 10/2015 | Saylor | H04L 63/123 | |
| 9,251,326 B2* | 2/2016 | Giobbi | G07C 9/00087 | |
| 2003/0070072 A1* | 4/2003 | Nassiri | H04L 9/32 | 713/168 |
| 2003/0177360 A1* | 9/2003 | Carmichael | G06Q 10/10 | 713/176 |
| 2006/0193004 A1* | 8/2006 | Wasilewski | H04N 1/00127 | 358/1.15 |
| 2006/0259307 A1* | 11/2006 | Sanders | G06F 17/289 | 705/26.1 |
| 2008/0028455 A1* | 1/2008 | Hatter | G06F 21/305 | 726/10 |
| 2008/0209516 A1* | 8/2008 | Nassiri | G06F 21/32 | 726/3 |
| 2009/0049298 A1* | 2/2009 | Hatter | H04L 9/32 | 713/176 |
| 2009/0304240 A1* | 12/2009 | Simonian | G06K 9/00006 | 382/124 |
| 2010/0138659 A1* | 6/2010 | Carmichael | G06Q 10/10 | 713/170 |
| 2010/0250676 A1* | 9/2010 | Ufford | G06Q 10/107 | 709/204 |
| 2011/0213700 A1* | 9/2011 | Sant'Anselmo | G06Q 10/10 | 705/39 |
| 2012/0036081 A1* | 2/2012 | Hatter | G06Q 10/10 | 705/321 |
| 2012/0136793 A1* | 5/2012 | Valin | G06Q 20/10 | 705/53 |
| 2012/0214442 A1* | 8/2012 | Crawford | H04W 12/06 | 455/411 |
| 2012/0278155 A1 | 11/2012 | Faith | | |
| 2013/0311772 A1* | 11/2013 | Etheridge | H04L 9/3247 | 713/156 |
| 2016/0219046 A1* | 7/2016 | Ballard | H04L 63/0861 | |

FOREIGN PATENT DOCUMENTS

| | | |
|---|---|---|
| KR | 10-2005-0053396 A | 6/2005 |
| KR | 10-0790223 B1 | 1/2008 |
| WO | WO 2009/084001 A2 | 7/2009 |

OTHER PUBLICATIONS

"2-Step Verification," Google (2016). https://www.google.com/landing/2step/.
99 designs. http://99designs.com (2016).
Amazon Mechanical Turk. https://www.mturk.com/mturk/welcome (2016).
Crowdsourcing.org: The Industry Website. http://www.crowdsourcing.org/ (2016).
FBI—Common Fraud Schemes. https://www.fbi.gov/scams-safety/fraud (2016).
"Find my iPhone" by Apple, Version 4.0, Updated Sep. 17, 2014. https://itunes.apple.com/us/app/find-my-iphone/id376101648?mt=8 (Retrieved May 24, 2016).
Geek Squad Locked & Found, How It Works, https://lockedandfound.geeksquad.com/how_it_works (Retrieved May 24, 2016).
GitHub—zxing/zxing: Official Zxing ("Zebra Crossing") project home. https://github.com/zxing/zxing (Retrieved May 25, 2016).
GWT Project. http://www.gwtproject.org/ (Retrieved May 25, 2016).
Hsieh, "Crowd Sourced Formal Verification (CSFV)," Defense Advanced Research Projects Agency (DARPA). http://www.darpa.mil/program/crowd-sourced-formal-verification (Retrieved May 24, 2016).
Indiana University Center for Survey Research. https://csr.indiana.edu/ (Retrieved May 24, 2016).
InnoCentive. https://www.innocentive.com/ (Retrieved May 24, 2016).
iStock. http://www.istockphoto.com/ (Retrieved May 24, 2016).
"Boosting Web Communication," jWebSocket—The open source solution for realtime web developers. http://jwebsocket.org/ (Retrieved May 25, 2016).
"Libgcrypt," GNU Project, Free Software Foundation (FSF) http://www.gnu.org/software/libgcrypt/ (Retrieved May 25, 2016).
OpenJDK, 2016 Oracle Corporation. http://openjdk.java.net/ (Retrieved May 25, 2016).
Red5—Red5 Media Server. http://red5.org/ (Retrieved May 25, 2016).
"SafePass®," Online Banking Security Enhancements, Bank of America (2016). https://www.bankofamerica.com/privacy/online-mobile-banking-privacy/safepass.go.
"SharePoint," Microsoft. https://products.office.com/en-US/sharepoint?legRedir=true&CorrelationId=eb448be9-1cb6-4735-8577-c6c0ae6ae34d (Retrieved May 24, 2016).
"SitePal™—What does your site say?," Sitepal.com http://www.sitepal.com/ (Retrieved May 25, 2016).
WebRTC Home, WebRTC. https://webrtc.org/ (Retrieved May 25, 2016).
"Who Wants to Be a Millionaire?," Wikipedia—The Free Encyclopedia, https://en.wikipedia.org/wiki/Who_Wants_to_Be_a_Millionaire%3F (Retrieved May 25, 2016).
Wikipedia—The Free Encyclopedia. https://en.wikipedia.org/wiki/Main_Page (Retrieved May 25, 2016).
"Smart people easier to scam," 419 Advance Fee Fraud Statistics 2013, Ultrascan Advanced Global Investigations (Jul. 23, 2014).
Chandler et al., "Breaking monotony with meaning: Motivation in crowdsourcing markets," arXiv:1210.0962v1 [stat. OT], pp. 1-26 (Oct. 3, 2012).
Lipford et al., "Reconciling privacy with social media," CSCW '12, Workshop Summary, pp. 19-20 (Feb. 11-15, 2012).

(56) References Cited

OTHER PUBLICATIONS

Patil et al., "Are you exposed? Conveying information exposure," The 2012 ACM Conference on Computer Supported Cooperative Work (CSCW '12), Seattle, Washington, USA (Feb. 11-15, 2012).
Au et al., "BLACR: TTP-Free blacklistable anonymous credentials with reputation," 19th Annual Network and Distributed System Security Symposium (NDSS) (Feb. 2012).
Bugiel et al., "Towards taming privilege-escalation attacks on Android," 19th Annual Network and Distributed System Security Symposium (NDSS) (Feb. 2012).
Patil et al., "My privacy policy: Exploring end-user specification of free-form location access rules," pp. 1-12 (2012).
Smith, "Nearly half of American adults are smartphone owners," Pew Research Center, Tech. Rep. (2012).
Jahid et al., "DECENT: A decentralized architecture for enforcing privacy in online social networks," arXiv:1111.5377v2 [cs.CR] (Dec. 16, 2011).
Caine et al., "DigiSwitch: A device to allow older adults to monitor and direct the collection and transmission of health information collected at home," J. Med. Syst., vol. 35, pp. 1181-1195 (Oct. 30, 2011).
Felt et al., "Android permissions demystified," CHI '11, pp. 627-637 (Oct. 17-21, 2011).
Mao et al., "Loose Tweets: An analysis of privacy leaks on Twitter," WPES '11, pp. 1-11 (Oct. 17, 2011).
Nilizadeh et al., "Pythia: A privacy aware, peer-to-peer network for social search," The 2011 ACM Workshop on Privacy in the Electronic Society (WPES '11), Chicago, Illinois, USA (Oct. 17, 2011).
Kaufmann et al., "More than fun and money. Worker motivation in crowdsourcing—A study on Mechanical Turk," Proceedings of the 17th Americas Conference on Information Systems (AMCIS), pp. 1-11 (Aug. 4-7, 2011).
Schlegel et al., "Eyeing your exposure: Quantifying and controlling information sharing for improved privacy," Symposium on Usable Privacy and Security (SOUPS) 2011, pp. 1-14 (Jul. 20-22, 2011).
Shehab et al., "ROAuth: Recommendation based open authorization," Symposium on Usable Privacy and Security (SOUPS) 2011, pp. 1-12 (Jul. 20-22, 2011).
Au et al., "PEREA: Practical TTP-free revocation of repeatedly misbehaving anonymous users," Indiana University Technical Report TR688, pp. 1-41 (Jul. 2011).
Caine et al., "Audience visualization influences disclosures in online social networks," CHI 2011—Work-in-Progress, pp. 1663-1668 (May 7-12, 2011).
Guy et al., "Guess Who? Enriching the social graph through a crowdsourcing game," CHI 2011—Session: Crowdsourcing, pp. 1373-1382 (May 7-12, 2011).
Quinn et al., "Human Computation: A survey and taxonomy of a growing field," Proceedings of the 29th CHI 2011, pp. 1-10 (May 7-12, 2011).
Reeder et al., "More than skin deep: Measuring effects of the underlying model on access-control system usability," CHI 2011, Vancouver, BC, Canada (May 7-12, 2011).
Yu et al., "Cooks or cobblers? Crowd creativity through combination," CHI 2011—Session: Crowdsourcing, pp. 1393-1402 (May 7-12, 2011).
Bauer et al., "Detecting and resolving policy misconfigurations in access-control systems," ACM Transactions on Information and System Security, vol. 14, No. 1, pp. 1-30 (May 2011).
Sirivianos et al., "SocialFilter: Introducing social trust to collaborative spam mitigation," Proceedings of the 30th IEEE International Conference on Computer Communications (Apr. 2011).
Tsang et al., "Nymble: Blocking misbehaving users in anonymizing networks," IEEE Transactions on Dependable and Secure Computing, vol. 8, No. 2, pp. 256-269 (Mar.-Apr. 2011).
Schlegel et al., "Soundcomber: A stealthy and context-aware sound Trojan for smartphones," Proceedings of the 18th Annual Network and Distributed System Security Symposium (NDSS), pp. 17-33 (Feb. 2011).

Bederson et al., "Web workers, unite! Addressing challenges of online laborers," CHI '11 Extended Abstracts on Human Factors in Computing Systems, pp. 1-4 (2011).
Horton et al., "The online laboratory: conducting experiments in a real labor market," Exp Econ, vol. 14, pp. 399-425 (2011).
Huang et al., "Amplifying limited expert input to sanitize large network traces," 2011 IEEE, pp. 494-505 (2011).
Libonati et al., "Usability testing a malware-resistant input mechanism," Proceedings of the 18th ISOC Network and Distributed System Security Symposium, pp. 435-451 (2011).
Sharek, "A useable, online NASA-TLX tool," Proceedings of the Human Factors and Ergonomics Society 35th Annual Meeting, pp. 1375-1379 (2011).
Sun et al., "TIR/VIS correlation for liveness detection in face recognition," Computer Analysis of Images and Patterns (CAIP), Part II, Lecture Notes in Computer Science vol. 6855, pp. 114-121 (2011).
Yuen et al., "A survey of crowdsourcing systems," 2011 IEEE International Conference on Privacy, Security, Risk, and Trust, and IEEE International Conference on Social Computing, pp. 766-773 (2011).
Tsang et al., "BLAC: Revoking repeatedly misbehaving anonymous users without relying on TTPs," ACM Transactions on Information and System Security, vol. 13, No. 4, Article 39, pp. 39:1-39:33 (Dec. 2010).
Adams et al., "MeD-Lights: A usable metaphor for patient controlled access to electronic health records," Proceedings of the 1st ACM International Health Informatics Symposium (IHI '10), pp. 800-808 (Nov. 11-12, 2010).
Caine et al., "DigiSwitch: Design and evaluation of a device for older adults to preserve privacy while monitoring health at home," IHI '10, pp. 153-162 (Nov. 11-12, 2010).
Luther et al., "Why it works (when it works): Success factors in online creative collaboration," Group '10, pp. 1-10 (Nov. 7-10, 2010).
Akavipat et al., "ReDS: Reputation for directory services in P2P systems," InsiderThreats '10, Chicago, Illinois, USA (Oct. 8, 2010).
Zhang et al., "The security of modern password expiration: An algorithmic framework and empirical analysis," CHI '10, Chicago, Illinois, USA (Oct. 4-8, 2010).
Horton et al., "Algorithmic wage negotiations: Applications to paid crowdsourcing," Proceedings of CrowdConf 2010 (Oct. 4, 2010).
Sharma, "Mobile lifting rampant in Delhi," Daily News & Analysis (Aug. 29, 2010). http://www.dnaindia.com/india/report-mobile-lifting-rampant-in-delhi-1430169.
Cooper et al., "Predicting protein structures with a multiplayer online game," Nature, vol. 466, pp. 756-760 (Aug. 5, 2010).
Little et al., "Exploring iterative and parallel human computation processes," KDD-HCOMP '10, pp. 1-9 (Jul. 25, 2010).
Silberman et al., "Sellers' problems in human computation markets," KDD-HCOMP '10, pp. 18-21 (Jul. 25, 2010).
Besmer et al., "The impact of social navigation on privacy policy configuration," Proceedings of the 6th Symposium on Usable Privacy ad Security (SOUPS) 2010 (Jul. 14-16, 2010).
Shin et al., "AnonySense: A system for anonymous opportunistic sensing," Journal of Pervasive and Mobile Computing, pp. 1-29 (Apr. 15, 2010).
Lampe et al., "Motivations to participate in online communities," CHI 2010, pp. 1-10 (Apr. 10-15, 2010).
Morris et al., "What do people ask their social networks, and why? A survey study of status message Q&A behavior," CHI 2010, Atlanta, Georgia, USA (Apr. 10-15, 2010).
Ross et al., "Who are the crowdworkers? Shifting demographics in Mechanical Turk," CHI 2010: Imagine all the People, pp. 2863-2872 (Apr. 10-15, 2010).
Cellan-Jones, "Government calls for action on mobile phone crime," BBC News (Feb. 11, 2010). http://news.bbc.co.uk/go/pr/fr/-/2/hi/technology/8509299.stm.
Back et al., "Facebook profiles reflect actual personality, not self-idealization," Psychological Science, vol. 21, No. 3, pp. 372-374 (2010).

(56) References Cited

OTHER PUBLICATIONS

Caine et al., "Older adults engage in privacy enhancing behaviors in a home monitored with robots or cameras," 2010 ACM, pp. 1-8 (2010).
Ipeirotis, "Analyzing the Amazon Mechanical Tuk marketplace," New York University (2010).
Little et al., "TurKit: Human computation algorithms on Mechanical Turk," Proceedings of the 23rd ACM UIST (2010).
Shahaf et al., "Generalized task markets for human and machine computation," Association for the Advancement of Articifial Intelligence, pp. 1-8 (2010).
Wright et al., "ReDS: Reputation for directory services in P2P systems," Proceedings of the 6th Annual Workshop on Cyber Security and Information Intelligence Research, CSIIRW '10, pp. 1-4 (2010).
Komando, "Lost or stolen smartphone? Find and erase it remotely," USA Today (Nov. 12, 2009). http://usatoday30.usatoday.com/tech/columnist/kimkomando/2009-11-12-lost-smartphones_N.htm.
Luther et al., "Predicting successful completion of online collaborative animation projects," C&C '09, pp. 391-392 (Oct. 26-30, 2009).
Zhan et al., "Authentication using multi-level social networks," Knowledge Discovery, Knowledge Engineering and Knowledge Management, First International Joint Conference, pp. 35-49 (Oct. 2009).
Herley, "So long, and no thanks for the externalities: The rational rejection of security advice by users," NSPW '09, pp. 1-12 (Sep. 8-11, 2009).
Westhoff, "Using the crowd: An exploration of conditions for crowdsourcing in the idea generation process," HayGroup, pp. 1-79 (Aug. 19, 2009).
Sirivianos et al., "FaceTrust: Assessing the credibility of online personas via social networks," Proceedings of the 4th USENIX Workshop on Hot Topics in Security, pp. 1-6 (Aug. 2009).
Soleymani et al., "Social authentication protocol for mobile phones," 2009 International Conference on Computational Science and Engineering, pp. 436-441 (Aug. 2009).
Goecks et al., "Challenges in supporting end-user privacy and security management with social navigation," Proceedings of the 5th Symposium on Usable Privacy and Security (SOUPS) 2009, pp. 1-12 (Jul. 15-17, 2009).
Mason et al., "Financial incentives and the 'Performance of Crowds'," KDD-HCOMP '09, pp. 77-85 (Jun. 28, 2009).
Panciera et al., "Wikipedians are born, not made—A study of power editors on Wikipedia," Proceedings of Group 2009, pp. 1-10 (May 10-13, 2009).
Rader, "Yours, mine and (not) ours: Social influences on group information repositories," CHI 2009—Social Software in Office, pp. 2095-2098 (Apr. 9, 2009).
Pirolli et al., "So you know you're getting the best possible information: A tool that increases Wikipedia credibility," CHI 2009—Studying Wikipedia, pp. 1505-1508 (Apr. 8, 2009).
Thom-Santelli et al., "What's mine is mine: Territoriality in collaborative authoring," CHI 2009—Personal and Online Information, pp. 1481-1484 (Apr. 8, 2009).
Caine, "Supporting privacy by preventing misclosure," CHI 2009—Doctoral Consortium, pp. 3145-3148 (Apr. 4-9, 2009).
Luther et al., "Pathfinder: An online collaboration environment for citizen scientists," Proceedings of the 27th CHI 2009, Boston, Massachusetts, USA, pp. 1-10 (Apr. 4-9, 2009).
Wyche et al., "Sacred imagery in techno-spiritual design," CHI 2009, Boston, Massachusetts, USA (Apr. 4-9, 2009).
Bauer et al., "Real life challenges in access-control management," CHI 2009, Boston, MA, USA (Apr. 3-9, 2009).
Poole et al., "Computer help at home: Methods and motivations for informal technical support," CHI 2009, pp. 1-10 (Apr. 3-9, 2009).
Schechter et al., "It's not what you know, but who you know—A social approach to last-resort authentication," 27th ACM Conference on Human Factors in Computing Systems (Apr. 2009).
Tryhorn, "Nice talking to you . . . mobile phone use passes milestone," The Guardian (Mar. 3, 2009). http://www.theguardian.com/technology/2009/mar/03/mobile-phones1.
Quinn et al., "A taxonomy of distributed human computation," Human-Computer Interaction Lab, University of Maryland, pp. 1-10 (2009).
Huberman et al., "Crowdsourcing, attention and productivity," Journal of Information Science, vol. 35, No. 6, pp. 758-765 (2009).
Kapadia et al., "Opportunistic Sensing: Security challenges for the new paradigm," The 1st International Conference on Communication Systems and Networks (COMSNETS), pp. 1-10 (2009).
Brabham, "Crowdsourcing the public participation process for planning projects," Planning Theory, vol. 8, No. 3, pp. 242-262 (2009).
Anthony et al., "Reputation and reliability in collective goods: The case of the online encyclopedia Wikipedia," Rationality and Society, vol. 21, No. 3, pp. 283-306 (2009).
Tsang et al., "PEREA: Towards practical TTP-free revocation in anonymous authentication," CCS '08, Alexandria, VA, USA (Oct. 27-31, 2008).
Dirks et al., "The transport layer security (TLS) protocol, version 1.2," IETC RFC 5246, pp. 1-104 (Aug. 2008).
Adu-Oppong et al., "Social circles: Tackling privacy in social networks," Symposium on Usable Privacy and Security (SOUPS) 2008, pp. 1-2 (Jul. 23-25, 2008).
Nolan et al., "Normative social influence is underdetected," The Society for Personality and Social Psychology, PSPB, vol. 34, No. 7, pp. 913-923 (Jul. 2008).
Wendlandt et al., "Perspectives: Improving SSH-style host authentication with multi-path probing," USENIX '08, USENIX Annual Technical Conference, pp. 1-14 (Jun. 2008).
Bauer et al., "A user study of policy creation in a flexible access-control system," CHI 2008, Carnegie Mellon University, Research Showcase @ CMU (Apr. 5-10, 2008).
Kittur et al., "Crowdsourcing user studies with Mechanical Turk," CHI 2008 Proceedings—Data Collection, Florence, Italy, pp. 453-456 (Apr. 5-10, 2008).
Reeder et al., "Expandable grids for visualization and authoring computer security policies," CHI 2008, Florence, Italy (Apr. 5-10, 2008).
Brabham, "Crowdsourcing as a model for problem solving: An introduction and cases," Convergence: The International Journal of Research into New Media Technologies, vol. 14, No. 1, pp. 75-90 (2008).
Kapadia et al., "AnonySense: Opportunistic and privacy-preserving context collection," Proceedings of the 6th International Conference on Pervasive Computing, pp. 280-297 (2008).
Snow et al., "Cheap and fast—But is it good? Evaluating non-expert annotations for natural language tasks," Proceedings of EMNLP, Association for Computational Linguistics (2008).
Sorokin et al., "Utility data annotation with Amazon Mechanical Turk," 2008 IEEE, pp. 1-8 (2008).
Nov, "What motivates Wikipedians?," Communications of the ACM, vol. 50, No. 11, pp. 60-64 (Nov. 2007).
Tsang et al., "Blacklistable anonymous credentials: Blocking misbehaving users without TTPs," CCS '07, Alexandria, VA, USA (Oct. 29-Nov. 2, 2007).
Mislove et al., "Ostra: Leveraging trust to thwart unwanted communication," SOSP 2007, Work in Progress Session, pp. 1-20 (Oct. 15, 2007).
Bauer et al., "Lessons learned from the deployment of a smartphone-based access-control system," Symposium on Usable Privacy and Security (SOUPS) 2007, pp. 1-12 (Jul. 18-20, 2007).
Cialdini, "Descriptive social norms as underappreciated sources of social control," Psychometrika, vol. 72, No. 2, pp. 263-268 (Jun. 2007).
Wong et al., "Sharing a single expert among multiple partners," CHI 2007 Proceedings, Expert/Novice, pp. 261-270 (Apr. 28-May 3, 2007).
Bauer et al., "Efficient proving for practical distributed access-control systems," Proceedings of the 12th European Symposium on Research in Computer Science, ESORICS '07 (2007).

(56) References Cited

OTHER PUBLICATIONS

Bowers et al., "Consumable credentials in logic-based access-control systems," Carnegie Mellon University Computer Science Department, pp. 1-15 (2007).
Johnson et al., "Nymble: Anonymous IP-address blocking," Proceedings of the 7th International Symposium on Privacy Enhancing Technologies (PET), Lecture Notes in Computer Science, vol. 4776, pp. 113-133 (2007).
Kapadia et al., "Virtual Walls: Protecting digital privacy in pervasive environments," 5th International Conference on Pervasive Computing, pp. 1-18 (2007).
Prakash, "Security in practice: Security-usability chasm," Electrical Engineering and Computer Science Division, University of Michigan, pp. 1-9 (2007).
Schechter et al., "The emperor's new security indicators—An evaluation of website authentication and the effect of role playing on usability studies," 2007 IEEE Symposium on Security and Privacy (SP'07) (2007).
Garg et al., "A Linear Logic of Authorization and Knowledge," Carnegie Mellon University, Research Showcase @ CMU, pp. 1-16 (Sep. 2006).
Howe, "Crowdsourcing: A Definition," Crowdsourcing, Why the Power of the Crowd is Driving the Future of Business http://crowdsourcing.typepad.com/cs/2006/06/crowdsourcing_a.html (Jun. 2, 2006).
Acquisti et al., "Imagined communities: Awareness, information sharing, and privacy on the Facebook," Privacy Enhancing Technologies (PET) 6th International Workshop, Lecture Notes in Computer Science, vol. 4258, pp. 36-58 (Jun. 2006).
von Ahn et al., "Peekaboom: A game for locating objects in images," CHI 2006, Montreal, Quebec, Canada (Apr. 22-28, 2006).
Brainard et al., "Fourth-factor authentication: Somebody you know," 13th ACM Conference on Computer and Communications Security, pp. 168-178 (2006).
Caine et al., "Understanding acceptance of high technology products: 50 years of research," Proceedings of the Human Factors and Ergonomics Society 50th Annual Meeting, pp. 2148-2152 (2006).
Cialdini et al., "Managing social norms for persuasive impact," Social Influence, vol. 1, No. 1, pp. 3-15 (2006).
D'Urso, "Who's watching us at work? Toward a structural-perceptual model of electornic monitoring and surveillance in organizations," Communication Theory, vol. 16, pp. 281-303 (2006).
Jammalamaaka et al., "Delegate: A proxy based architecture for secure website access from an untrusted machine," Proceedings of the 22nd Annual Computer Security Applications Conference (ACSAC), pp. 1-10 (2006).
Zhang et al., "Intrinsic motivation of open content contributors: The case of Wikipedia," Workshop on Information Systems and Economics (2006).
von Ahn, "Human Computation," PhD Thesis, Carnegie Mellon University, pp. 1-87 (Dec. 7, 2005).
Bauer et al., "Device-enabled authorization in the Grey system," Information Security: 8th International Conference, ISC 2005, Lecture Notes in Computer Science, vol. 3650, pp. 431-445 (2005).
Bauer et al., "Distributed proving in access-control systems," Proceedings of the 2005 IEEE Symposiums on Security and Privacy (S&P '05) (2005).
Kapadia, "Models for privacy in ubiquitous computing environments," Dissertation, University of Illinois at Urbana-Champaign (2005).
Lakhani et al., "Why do hackers do what they do: Understanding motivation and effort in free/open source software projects," Perspectives on Free and Open Source Software, pp. 1-27 (2005).
McCrae et al., "The NEO-PI-3: A more readable revised NEO personality inventory," Journal of Personality Assessment, vol. 84, No. 3, pp. 261-270 (2005).
McCune et al., "Seeing-Is-Believing: Using camera phones for human-verifiable authentication," Proceedings of the 2005 IEEE Symposium on Security and Privacy (S&P '05) (2005).
von Ahn et al., "Labeling images with a computer game," CHI 2004, Vienna, Austria (Apr. 24-29, 2004).
Bitzer et al., "The economics of intrinsic motivation in open source software development," (Mar. 2004).
Kapadia et al., "Know Why Your Access Was Denied: Regulating feedback for usable security," Department of Computer Science, University of Illinois at Urbana-Champaign, pp. 1-12 (Feb. 2, 2004).
Damiani et al., "P2P-Based collaborative spam detection and filtering," Proceedings of the Fourth International Conference on Peer-to-Peer Computing (P2P '04), pp. 1-8 (2004).
Wu et al., "Secure web authentication with mobile phones," DIMACS Workshop on Usable Privacy and Security Software (2004).
von Ahn et al., "CAPTCHA: Using hard AI problems for security," Proceedings of EUROCRYPT (May 2003).
MacKenzie et al., "Networked cryptographic devices resilient to capture," International Journal of Information Security, vol. 2, No. 1, pp. 1-20 (2003).
Walker et al., "An encoding advantage for own-race versus other-race faces," Perception, vol. 32, pp. 1117-1125 (2003).
MacKenzie et al., "Delegation of cryptographic servers for capture-resilient devices," ACM CCS '01, pp. 10-19 (Nov. 5-8, 2001).
Alavi et al., "Review: Knowledge management and knowledge management systems: Conceptual foundations and research issues," MIS Quarterly, vol. 25, No. 1, pp. 107-136 (Mar. 2001).
Bruce et al., "Matching identities of familiar and unfamiliar faces caught on CCTV images," Journal of Experimental Psychology: Applied, vol. 7, No. 3, pp. 207-218 (2001).
Bellare et al., "Key-privacy in public-key encryption," Advances in Coptology—Asiacopt 2001 Proceedings, Lecture Notes in Computer Science, vol. 2248, pp. 568-584 (2001).
Nystrom et al., "PKCS #10: Certification request syntax specification version 1.7," Network Working Group RFC 2986, pp. 1-14 (Nov. 2000).
Levin, "Race as a visual feature: Using visual search and perceptual discrimination tasks to understand face categories and the cross-race recognition deficit," Journal of Experimental Psychology: General, vol. 129, No. 4, pp. 559-574 (2000).
Burton et al., "Face recognition in poor-quality video: Evidence from security surveillance," Psychological Science, vol. 10, No. 3, pp. 243-248 (1999).
Bruce et al., "Verification of face identities from images captured on video," Journal of Experimental Psychology: Applied, vol. 5, No. 4, pp. 339-360 (1999).
Whitten et al., "Why Johnny Can't Encrypt: A usability evaluation of PGP 5.0," Proceedings of the 8th USENIX Security Symposium, pp. 1-16 (1999).
Reiter et al., "Resilient authentication using path independence," IEEE Transactions on Computers, vol. 47, No. 12, pp. 1351-1362 (Dec. 1998).
Pike et al., "Recognizing moving faces: The relative contribution of motion and perspective view information," Visual Cognition, vol. 4, No. 4, pp. 409-438 (1997).
Yarmey et al., "Face and voice identifications in showups and lineups," Applied Cognitive Psychology, vol. 8, pp. 453-464 (1994).
Bellotti et al., "Design for privacy in ubiquitous computing environments," pp. 1-16 (1993).
Valentine et al., "Towards an exemplar model of face processing: The effects of race and distinctiveness," The Quarterly Journal of Experimental Psychology, vol. 44, Section A, No. 4, pp. 671-703 (1992).
Davis, "Perceived usefulness, perceived ease of use, and user acceptance of information technology," MIS Quarterly, vol. 13, No. 3, pp. 319-340 (Sep. 1989).
Davis et al., "User acceptance of computer technology: A comparison of two theoretical models," Management Science, vol. 35, No. 8, pp. 982-1003 (Aug. 1989).
Kahneman et al., "Norm theory: Comparing reality to its alternatives," American Psychological Association, Inc., Psychological Review, vol. 93, No. 2, pp. 136-153 (1986).

\* cited by examiner

METHODS, SYSTEMS, AND COMPUTER READABLE MEDIA FOR COMBATING DEVICE THEFT WITH USER NOTARIZATION

PRIORITY CLAIM

This application claims the benefit of U.S. Provisional Patent Application Ser. No. 61/767,226, filed Feb. 20, 2013; the disclosure of which is incorporated herein by reference in its entirety.

GOVERNMENT INTEREST

This invention was made with government support under Grant Nos. CNS-0756998 and CNS-1016603 awarded by the National Science Foundation. The government has certain rights in the invention.

TECHNICAL FIELD

The subject matter described herein relates to authenticating mobile device users. More particularly, the subject matter described herein relates to combating device theft with user notarization.

BACKGROUND

Mobile devices, including smart phones, tablet computers, laptop computers, e-readers, mobile gaming consoles, or any combination thereof are the mechanism by which humans interact with various services. As the number of services with which humans interact using these devices increases, the devices themselves will be increasingly used to store sensitive user information, including credit card information, identity information and other private information. Because mobile devices are often lost or stolen, there exists a need for an improved mechanism for protecting the information stored on the devices.

More particularly, there exists a need for methods, systems, and computer readable media for combating device theft with user notarization.

SUMMARY

The subject matter described herein includes methods, systems, and computer readable media for combating mobile device theft with user notarization. One method includes providing a supplicant video notarization system application executable on a supplicant side device for initiating an interactive video call between a supplicant and a notary as a condition to the supplicant accessing a protected electronic resource. The method further includes providing a notary video notarization system application executable on a notary device through which the notary receives the interactive video call and interacts with the supplicant via the interactive video call to confirm the identity of the supplicant and that video of the supplicant provided in the call is live.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

In FIG. 2, steps 1 through 4 are executed, if necessary, between steps 1 and 2 of FIG. 1. Steps 5 and 6 are executed between steps 4 and 5 of FIG. 1.

In FIG. 3, site names indicate that sites have been configured with notaries or with passwords that the video notarization system protects. The "managed sites", "managed devices", and "managed notaries" support the addition or deletion of websites, display hosts, and notaries, respectively.

DETAILED DESCRIPTION

Figure 1:
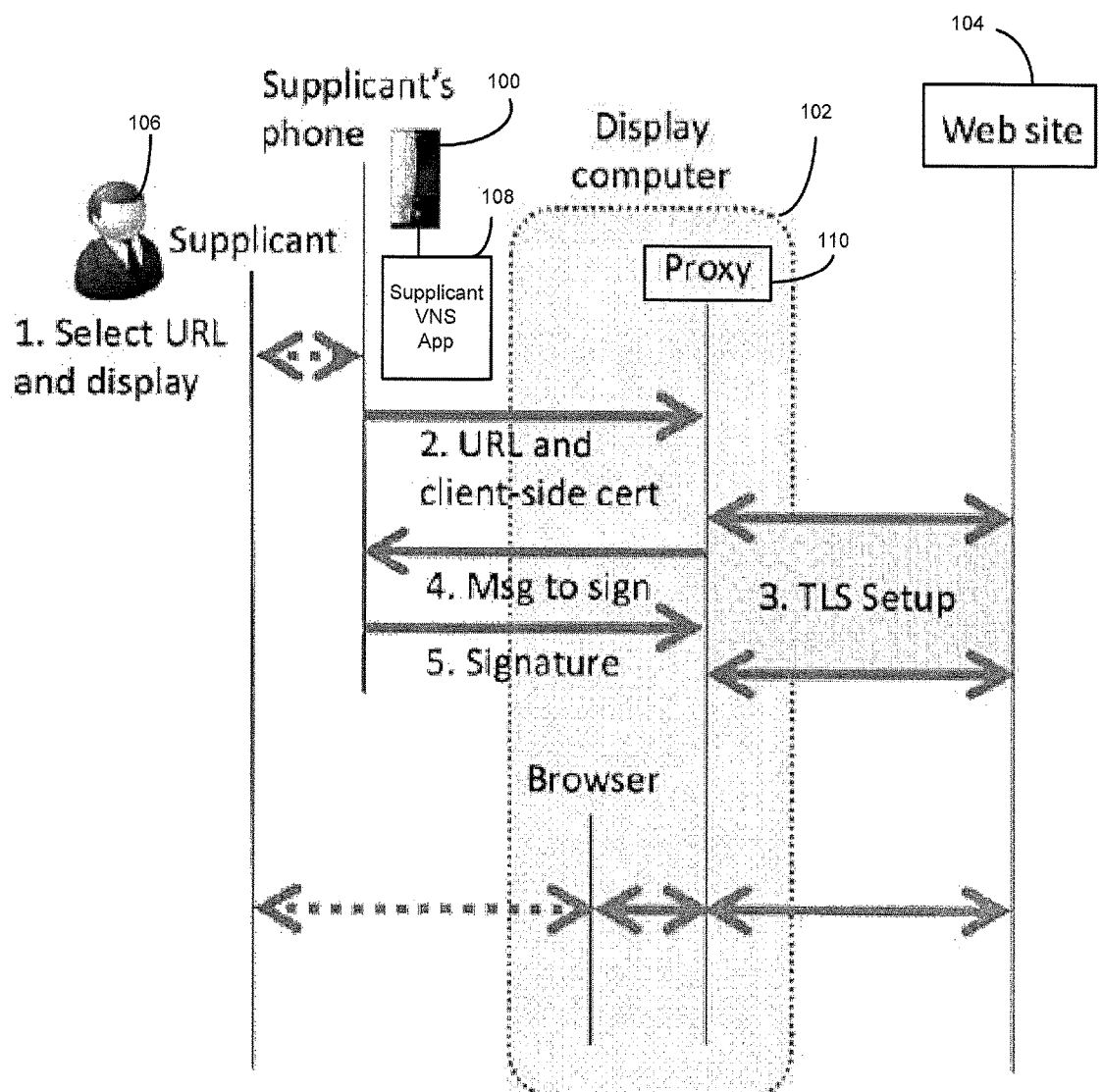
FIG. 1 is a message flow diagram illustrating exemplary messages exchanged between a supplicant device and a proxy using a video notarization system (VNS) according to an embodiment of the subject matter described herein.

The subject matter described herein includes methods, systems, and computer readable media for combating device theft or any other unauthorized use using a video notarization system. The subject matter described herein can be used to combat theft of any electronic device on which a user stores sensitive information and that has audio and video communications capabilities. Examples of such devices include desktop computers, laptop computers, tablet computers, smart phones, e-readers, gaming consoles, and any combination thereof.

The terms "notary" and "notarization service", as used herein, respectively refer to the individual and the service through which a device user is authenticated. The terms "notary" and "notarization service" are not intended to be limited to the traditional definitions of these terms, which refer to the individual or service authorized by a state or other entity to witness and attest to signatures.

I. INTRODUCTION

There are over 4 billion cellular mobile devices in use today worldwide [1], and around one in two American adults own smartphones [2]. It is inevitable that these devices will become the primary portals by which humans interact with services, including remote services (e.g., banking and healthcare web sites) and more local ones (e.g., point-of-sale terminals or automatic teller machines, where the device may replace a credit or debit card). Since many of these services will be security-critical for the user, it is similarly inevitable that mobile devices will be the repository for credentials (e.g., signature or decryption keys) that earn the supplicant access to these services or to local information (e.g., sensitive information downloaded from those services, not to mention private text messages and emails).

Because these devices are mobile and nearly constantly carried, they are a common target of theft; e.g., 228 mobile phones were reported stolen in the UK per hour in 2010 [3]. As such, it is critical that these devices, or the credentials they hold, be rendered unusable in the wrong hands. Numerous tools exist to track and remotely erase data on stolen phones, but a thief can interfere with these by simply powering off the phone or putting the phone in airplane mode, for example [4]. In the absence of tamperproof hardware on the device, authentication of the user in a purely local fashion will be unable to protect against reverse-engineering the device and extracting the corresponding credentials. Consequently, the subject matter described herein provides a means to authenticate the device user, as a precondition to the device using the credentials it holds, by a remote entity that is out-of-reach of the attacker (c.f., [5]).

There are many alternatives by which this remote entity might authenticate the device user. Passwords or PINs ("what you know") are one option, but these secrets are often guessed or stolen. Other solutions involve, e.g., biometric recognition by fingerprint or face recognition ("what you are"). However, biometrics can require hardware on devices that is not ubiquitous (e.g., for scanning fingerprints) and some means to ensure that the biometric readings are collected from the live user, versus being replayed (e.g., in the case of face recognition, from a stored video).

The subject matter described herein includes an alternative to authentication based on "what you know" or "what you are," in which, a notary, which in one embodiment is a person in the device owner's social network, confirms that the current device user (the supplicant) is, in fact, the device owner. To do so, the notary interacts with the supplicant by video chat, for example. If the notary assents, then the use of the device's credentials can progress as usual. However, if the notary refuses, then the use of the credentials will be blocked even by an attacker with physical possession of the device (and the skill to reverse engineer it). Our approach, which we call notarization, further ensures that the notary cannot impersonate the device owner (or his device) without physical access to the device. We expect that notarization is suitable primarily for protecting high-value data or transactions, e.g., transferring or withdrawing bank funds past some limit or decrypting sensitive files (e.g., health documents) on the device.

Based on this idea, we detail the design of VNS (for Video Notarization System), a device-resident application that supports notarization to enable the use of credentials on the mobile device. VNS specifically protects the use of cryptographic keys to decrypt device-resident content or to perform digital signatures in support of a connection using client-side TLS. Moreover, it can support client-side TLS connections to web sites from a display computer other than the device hosting it. This usage requires additional software to be installed on the display computer, as well, which we also describe.

Beyond notarization by someone in the device owner's social network, VNS also supports notarization by a stranger using a certified photograph of the device owner. Notarization by a stranger may be of use not only when the device owner's social contacts are unavailable for notarizing, but also in cases where specialized notaries (e.g., working for a bank) may be required to notarize supplicants. While it is known that social contacts such as friends and colleagues would easily recognize supplicants [6], an open question is whether strangers can reliably notarize supplicants. We also report the results of a user study designed to shed light on this question.

To summarize, we make at least two contributions. First, we describe the design and implementation of VNS, which utilizes notarization by video as a method for authenticating supplicants. We demonstrate how VNS can facilitate (and protect) the establishment of client-side TLS connections, as a primary use case. Moreover, this is accomplished without permitting the notary to impersonate the supplicant and without divulging sensitive information to the notary. Second, through a detailed user study, we shed light on the effectiveness of using strangers as notaries. Our results show that even with impersonation attacks using sophisticated avatars, notarization by strangers can be a viable, even if not perfect, method for protecting against impersonation attacks.

The remainder of the description herein is organized as follows. In Section II, we survey related work. We detail the design of VNS in Section III. We discuss our user study in Section IV. We conclude in Section V.

II. RELATED WORK

There have been several designs by which a person leverages others in his or her social network to enable access to resources, either to prevent someone who has stolen his device from doing so (as we do here) [7], [8] or to regain access after losing one or both of his authentication factors [9], [10]. These works address only scenarios in which the device is used to access a remote resource (e.g., a web site); unlike ours, their designs do not provide protection for on-device data. Moreover, these techniques require coordination with (and changes to) the remote resource. In contrast, a device owner can leverage our technique without requiring software changes to the remote resource, in that the device signatures produced by our design are indistinguishable from ones produced without our defenses. Aside from making deployment easier, this also permits the device owner to use our defense unilaterally, in a fashion analogous to writing "check id" in the signature field of a credit card. Finally, none of these prior works focus specifically on the use of video chats to enable authentication of the device owner or evaluate the hazards thereof, as we do here.

Existing studies in psychology have shown the relative ease with which participants can identify familiar faces and the difficulty they have identifying unfamiliar ones [6], [11], [12]. These results (and intuition) suggest that people would have little trouble identifying members of their social network, but that using strangers as notaries deserves some careful thought. Pike et al. [13] show that motion appears to aid recognition. However, none of the previous studies evaluated the use of interactive video as we do here.

With the increased ubiquity of mobile phones, there have been a number of systems that rely on them to help secure web authentication. To add an additional layer of protection against password theft, some services provide support for two factor authentication by sending a unique code via SMS which must be entered following input of the usual password (e.g., [14], [15]). This provides no protection against phone theft, however; in that case, security is reduced to knowledge of the password only. Other systems utilize trusted mobile phones to securely access websites from untrusted machines (e.g., [16], [17]). While VNS also utilizes a mobile device to support access to websites from an untrusted display computer, our focus here is at least as much on protecting against the misuse of a stolen mobile device (using notarization by others) as it is on defending against display computer compromise.

III. DESIGN OF A VIDEO-CHAT NOTARIZATION SYSTEM

In this section we provide an overview of the design of VNS. We begin in Section III-A with a discussion of the threat model and goals that the system is designed to address. We then give an overview of the system, including the user experience, in Section III-B. We provide selected implementation details in Section III-C and discuss limitations of our design in Section III-D.

A. Goals

As discussed in Section II, VNS is one of several systems that adopt mobile devices (primarily smartphones) as a means by which users gain access to protected resources, be it at a remote web site or on the device itself. A central goal of VNS is to deal with the loss or theft of the device and specifically to ensure that an attacker—even one skilled in reverse-engineering the device—is unable to misuse a device he has captured to access the resources that the legitimate owner could access with it.

Achieving this goal requires a second authentication factor beyond possession of the device. Unlike traditional second factors (e.g., passwords/PINs or biometrics), VNS leverages authentication of the user, who for the purposes of notarization we term the supplicant, by her social network, via video interaction with a notary.

Such authentication will intrinsically incur higher social overhead than a simple password/PIN or biometric that can be automatically checked, however. Therefore, we also require that VNS support second-factor authentication by password/PIN for other resources and anticipate that users will configure VNS to require video authentication only for more sensitive ones, such as online banking. That said, we also anticipate that VNS will encourage sensitive resources to be accessed opportunistically, i.e., after a video interaction with a notary has taken place for other reasons, suggesting that the social overhead of this approach may be less than initially expected.

It is important to recognize that regardless of whether the legitimate device owner is confirmed by way of video interaction, biometrics, or password/PIN, the inclusion of device reverse-engineering in our threat model requires that this confirmation be performed off the device. (A reverse engineer could simply alter the device to remove this confirmation locally.) 'VNS places this control either within the mobile device of the notary or within an intermediary cloud service, as will be discussed in Section III-C. We will assume in the description herein that this device/service is not compromised, though we stress that it (provably) has no capabilities to impersonate the devices it notarizes, as discussed in Section III-B. Rather, its compromise can, at worst, reduce the supplicant's security to depending solely on the possession of her device, i.e., a single factor of authentication.

B. Overview

Protection of resources via VNS is performed by regulating the use of cryptographic keys that are needed to access those resources. Presently, VNS is designed to protect the use of keys of two varieties: private digital signing keys that can be used to access remote web sites via client-side transport layer security (TLS) [18], and private decryption keys for decrypting either passwords for entry to remote web sites or other data stored locally on the mobile device (e.g., emails, SMS messages).

As such, beyond simply the components for protecting the use of these cryptographic keys, VNS involves various other software components to bring the protected resources under its control. For example, to digitally sign for the client in a TLS exchange, VNS must gain access to the value to digitally sign. We implement this by proxying TLS through a proxy local to the machine on which the browser is being run, which need not be the mobile device. This proxy exports the value to sign to the mobile device (e.g., over Bluetooth or TCP/IP), which signs the value (subject to controls that will be described later) and returns it to the proxy. Similarly, in order to protect emails and SMS messages stored on the device, we require custom-designed email and SMS clients that integrate with the VNS key-protection facilities. At the time of this writing, we have completed only the components to support client-side TLS and local encryption of passwords (but not emails and SMS messages), and so we will focus on these use cases, and particularly the integration of VNS with client-side TLS.

Figure 2:
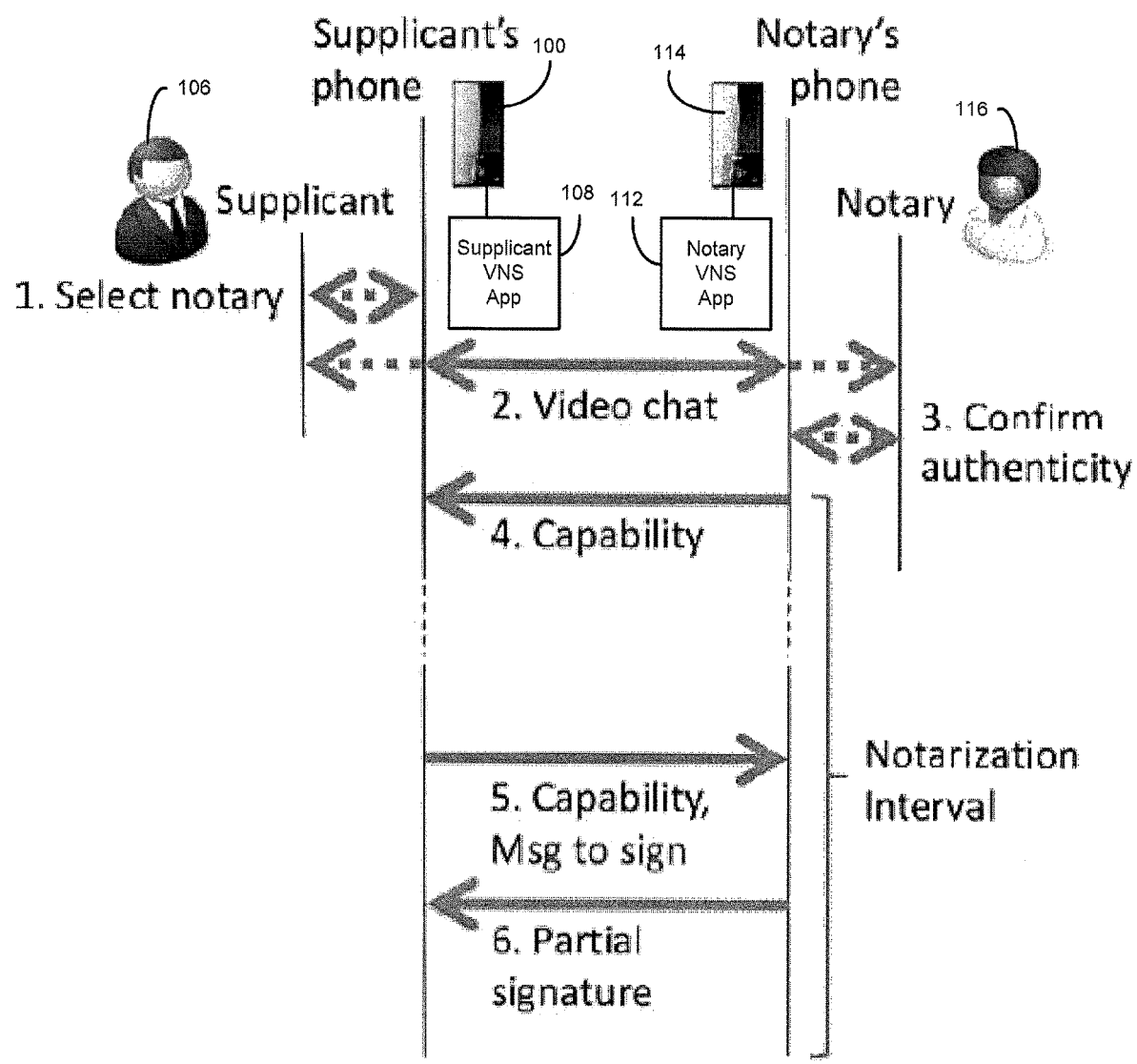
FIG. 2 is a message flow diagram illustrating an overview of a video notarization process and control.

1) TLS Use Case:

Using VNS to support client-side TLS is shown in FIG. 1. In FIG. 1, the client side of a system for combating device theft using video notarization according to an embodiment of the subject matter described herein is implemented on a supplicant device 100, which in the illustrated example is the supplicant's mobile telephone. FIG. 2 also illustrates a display computer 102 separate from supplicant device 100 used to access the protected resource, which in the illustrated example is a web site 104. In step 1 illustrated in FIG. 1, access to protected web site 104 is directed supplicant device 100, where a supplicant 106 first selects the URL (from a list of bookmarks in an application, referred to herein as supplicant VNS application 108) and then selects a computer to which this URL should be displayed (from a list of previously registered computers, which could include the phone itself or a separate computer). In the illustrated example, it is assumed that supplicant 106 selects display computer 102. Supplicant VNS application 108 first checks to see whether supplicant 106 has recently been authenticated using the technique—either password/PIN or video-chat—that the device owner specified for this URL when the URL was entered into the bookmarks. If so, in step 2, supplicant VNS application 108 connects to a proxy 110 on display computer 102 and reports the URL indicated by supplicant 106 and the client-side TLS certificate that the owner previously indicated for this URL. In step 3, proxy 110 initiates a client-side TLS connection to the web site and, at the appropriate time in that negotiation, in step 4, forwards to supplicant device 100 (over the still-open connection) the TLS message requiring a digital signature with the private key corresponding to the public key in the client-side TLS certificate. In step 5, supplicant device 100 returns the signature—after taking several other steps that are invisible to proxy 110, described below—allowing proxy 110 to complete the TLS exchange. Once proxy 110 has done so, proxy 110 communicates to a browser extension to open the retrieved content in a new browser tab, and supplicant 106 can interact with the page as normal.

2) Notarization:

In step 1 of FIG. 1, after supplicant 106, selects the URL of the website that supplicant 106 wishes to contact, If upon checking whether the user has recently been authenticated as required to use the chosen URL, supplicant VNS application 108 finds that he has not, then supplicant VNS application 108 initiates the required authentication before connecting to proxy 110. FIG. 2 illustrates exemplary steps for authentication using video notarization according to an embodiment of the subject matter described herein. Referring to FIG. 2, in step 1, if the method of authentication required for the selected URL is video chat, then the supplicant application 108 prompts supplicant 106 to select a notary to authenticate him, from a list of allowable notaries previously configured for this URL by the device owner. In step 2, upon selection of the notary, supplicant VNS application 108 establishes a video chat with a notary VNS application 112 on a notary device 114, which in the illustrated example is the notary's mobile telephone. Once the video connection is established, in step 3, a notary 116, can indicate (or not) the authenticity of supplicant 106. If notary 116 is satisfied with the authenticity of supplicant 106, in step 4, notary VNS application 112 conveys to supplicant VNS application 108 a capability that is valid for a notarization interval of a preconfigured amount of time.

During the notarization interval, supplicant device 100 can interact with notary device 114 (without interrupting notary 116 in order to perform cryptographic operations. Protocols to force supplicant device 100 to interact with notary device 114 to perform cryptographic operations, without permitting notary device 114 to learn the supplicant's private key, are well known; we employ protocols due to MacKenzie and Reiter [5], [19]. Briefly, these protocols cryptographically share the private key between the supplicant's and notary's devices 100 and 114, and permit notary device 114 to contribute a partial signature on the message to be signed, using its share of the key. Supplicant device 114 can then complete the signature using its share. Notary device 114 cooperates in this protocol only if presented the capability it generated during the notarization process, and only during the notarization interval.

Alternative protocols exist that remove the need for an interaction per signature (steps 5-6 in FIG. 2), by reconstructing the private signing key at supplicant device 100 for the duration of the notarization interval (see [5]). We employ protocols that never recreate the private signing key on supplicant device 100, since recreating the private signing key would allow a reverse engineer who captures supplicant device 100 during the notarization interval to extract it. Moreover, the device owner can destroy its authorization proactively (e.g., because he is done with his sensitive task) by simply deleting the capability, if he so chooses, to prevent an attacker who then captures the device from making use of the authorization.

3) Notarization by a Stranger:

The set of possible notaries that the device owner can configure for notarizing the use of a URL includes, in addition to members of the device's address book, an 'Anyone" option. If a URL is configured so that the "Anyone" option is available for it, and if the supplicant selects this option in order to be notarized, then the supplicant's phone contacts a cloud-resident VNS service for notarizing the supplicant. In this case, the device must forward the selected client-side TLS certificate (but not its share of the private key, of course) to the service. Moreover, this certificate must have been created to include a photograph of the device owner. (We will discuss certificate creation in Section III-B4.)

The role of the VNS service is to provide a portal for persons who are interested in notarizing others (presumably for pay, in a fashion similar to Amazon's Mechanical Turk) to be paired up with those needing notarization, or to otherwise implement a "call center" for notarization of device users by trained notaries (in the case of a bank, for example). In this case, the notary is presented with the certified photograph of the device owner and a live video feed of the supplicant. The notary is then asked to confirm that the person in the video is pictured in the certified photograph and that the video feed is live, presumably by interacting with the supplicant. If the notary then indicates the authenticity of the supplicant, the VNS service sends a capability to the supplicant's device. During the notarization interval for that capability, the VNS service will respond to requests to sign messages by producing a partial signature using its share of the device's private key (see [19]). The process of notarization in the "Anyone" case is thus very similar to that in FIG. 2, with the VNS service playing the role of the notary's phone.

4) Initialization:

The process by which a device owner initializes his device for supporting notarization is not particularly complex. Below we describe the primary steps for initialization (aside from downloading supplicant VNS application 108 itself).

URLs:

URLs requiring authorization can be added to supplicant VNS application 108 by manual entry or by visiting the relevant URL in the phone's browser and selecting the "Share Page" option (Android) or clicking a custom bookmark (iPhone).

Notaries:

A list of possible notaries, which the user can assign to URLs manually, can be imported from the phone's address book. When a notary is first used, a new two-party sharing of the relevant private key is established with notary device 114 through a delegation protocol [19]. Before a notary has been established for a key, it is important that the key is not stored in whole on supplicant device 100. Thus, the initial two-party sharing of each private key is performed between supplicant device 100 and a cloud-resident VNS service (the same one that facilitates the "Anyone" option) immediately after the key is created. Delegating to a new notary therefore involves this service.

This delegation protocol requires a public key from notary device 114, which can be obtained through an in-person key exchange (e.g., [20]) or simply sent from notary device 114 upon first use (i.e., a trust-on-first-use model, as is used in SSH). The public key for the cloud-resident VNS service can be shipped with supplicant VNS application 108 or, again, established by trust-on-first-use. Note that decryption with the private key corresponding to the notary's public key (or, obviously, the cloud-resident VNS service's) should not itself require notarization. This key pair is used exclusively to support delegation.

Supplicants:

For the purposes of notarizing supplicants, a notary need not configure her notary VNS application 112 except to import public keys with which to authenticate notarization requests from allowed supplicants. (Alternatively, the supplicant's device's phone number could be used to identify it, though obviously at a lower level of security.) As above, a supplicant's public key can be obtained by notary device 114 through an in-person key exchange or by trust-on-first-use. Also like the notary's public keys to support the delegation protocol described above, the private key corresponding to a public key that a supplicant registers with a notary to enable the notary to authenticate his notarization requests should be single-purpose and not itself require notarization to use.

Display Hosts:

A host to which the device owner plans to direct web pages will first need to have additional software installed on it, beyond the web browser. This software will include proxy 110 to which the supplicant VNS application 108 will connect, the browser extension that permits proxy 110 to open tabs in the browser and provide content, and software for facilitating its "pairing" with supplicant VNS device 100. The last of these displays the proxy's addressing information (presently we use the host's IP address and the port number on which proxy 110 listens, as well as the Bluetooth address of the host) in a 2-dimensional barcode on the host screen, permitting supplicant VNS application 108 on supplicant device 100 to import this information by photographing it (c.f., [20], [21]).

Client-Side Certificates:

Supplicant VNS application 108 supports the standard Certificate Signing Request (CSR) procedure [22] (also implemented by popular web browsers) for obtaining a certificate from the server or from a certificate authority (CA) that the server trusts. The primary addition that VNS requires for this process is the inclusion of a picture of the device owner in each certificate request for which notarization by "Anyone" is to be supported. Of course, since most smartphones and similar devices include a camera, obtaining a suitable picture should rarely pose a difficulty.

5) Privacy:

Involving another person (the notary) in the process of notarizing a user raises the potential for privacy issues for both the notary and the supplicant. Here we briefly review the steps we have taken in our design to minimize those privacy risks.

Supplicant Privacy:

Regardless of whether VNS is used to protect a device's signing key for client-side TLS sessions or to decrypt a ciphertext on the device, no cryptographic secrets are revealed to notary device 114 that would permit notary device 114 to impersonate supplicant device 100 (e.g., in the TLS session being established) or to recover the plaintext being computed. The URL or domain being accessed by the supplicant in a TLS establishment is also not directly revealed to the notary or his device. That said, a ciphertext created under the web site's public key is revealed to notary device 114. If the encryption algorithm used is not key-private [23], then this ciphertext can reveal statistical information about what web site is being accessed. VNS therefore cautions the user to select only notaries for a URL who he would be comfortable learning that he had visited that site.

Notary Privacy:

To protect the notary's privacy during notarization by "Anyone," the video in this case is one-way: The notary can see the supplicant, but the supplicant can only hear the notary. Note that it is necessary for the notary to see the supplicant, to match him to the photograph displayed to the notary. Other notarization sessions, involving a notary from the supplicant's social network, enable the notary to select per session whether the supplicant can see video of the notary.

C. Implementation and User Experience

We have implemented VNS for Android, and consequently the bulk of the application for the mobile device is written in Java using the Android SDK [24], though parts of the application are written in C and utilize the Android NDK [25]. TLS-secured device-to-device communication is handled by the Smack XMPP library [26]. The core cryptographic protocol in VNS is implemented using Libgcrypt [27]. Our video chat implementation is based on the WebRTC framework [28] and libjingle [29].

To support using VNS for setting up TLS sessions, display computer 102 runs proxy 110, which is an adaptation of mitmproxy [30], a Java-based SSL proxy that acts as a "man in the middle". We use a modified SSL implementation based on OpenJDK [31] to intervene in the SSL handshake as required by our protocol. Using the Google Web Toolkit [32], we developed a browser extension for receiving directions from the proxy to display content in a new tab. This extension also includes code from the open source ZXing multi-format 1D/2D barcode image processing library [33] to handle QR code generation. We employ the jWebSocket Java websocket server [34] to facilitate TLS-secured communication between supplicant VNS device 100 and proxy 110 and between proxy 110 and the browser extension via our custom plugins.

We are currently implementing the cloud service for initialization, delegation (sharing of keys), and managing notarization by strangers using a similar set of tools as supplicant VNS application 108 and hosting it on our own server. Since we do not expect users of VNS to maintain their own application in the cloud, this type of service is something we can imagine being picked up by a service provider.

Figure 3:
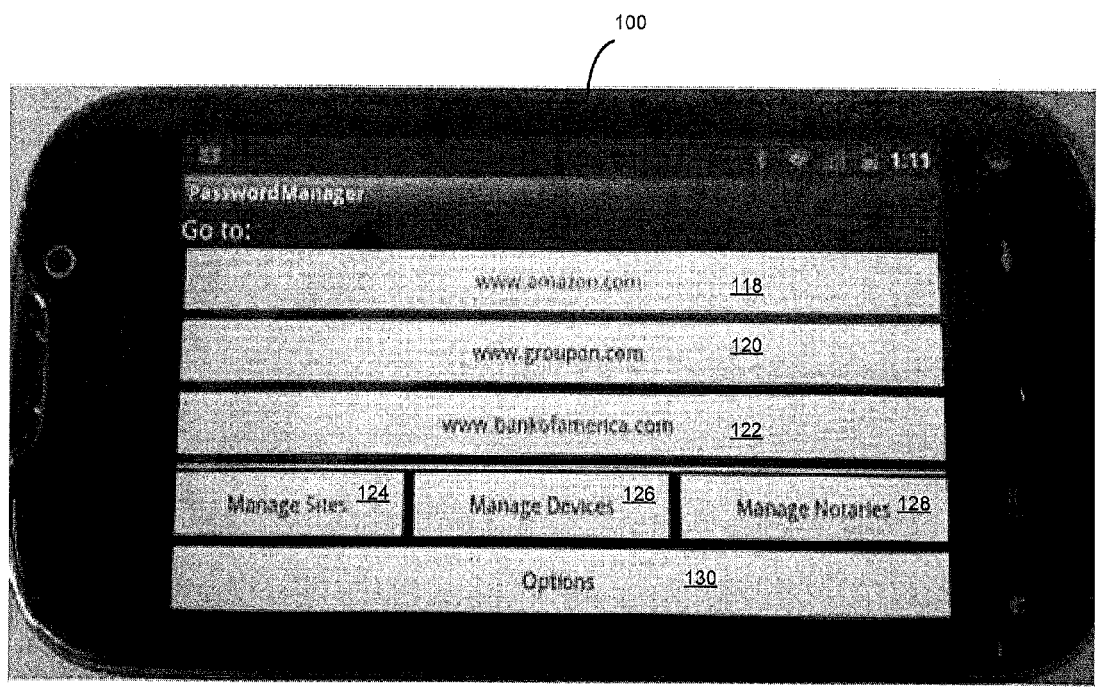
FIG. 3 is a diagram illustrating a supplicant interface of a video notarization system according to an embodiment of the subject matter described herein.

The common-case use of supplicant VNS application 108 involves a simple menu-driven interface, e.g., to select a notary, or a URL and then a host display. An exemplary user interface that may be displayed by supplicant VNS application 108 is pictured in FIG. 3. In FIG. 3, the interface includes URL activation buttons 118, 120, and 122 that allow a user to access the indicated URLs, subject to successful notarization. The saved list of URLs contains both sites for which the user holds a TLS client-side certificate and sites that require a password based login. The user interface also includes a manage sites button 124 that allows the supplicant to add URLs to the list, a manage devices button 126 that allows the supplicant to select a display computer 102, and a manage notaries button 128, which allows the supplicant to define notaries used in the VNS service. The user interface also includes an options button 130, which allows the supplicant to define other options associated with the VNS service.

Figure 4:
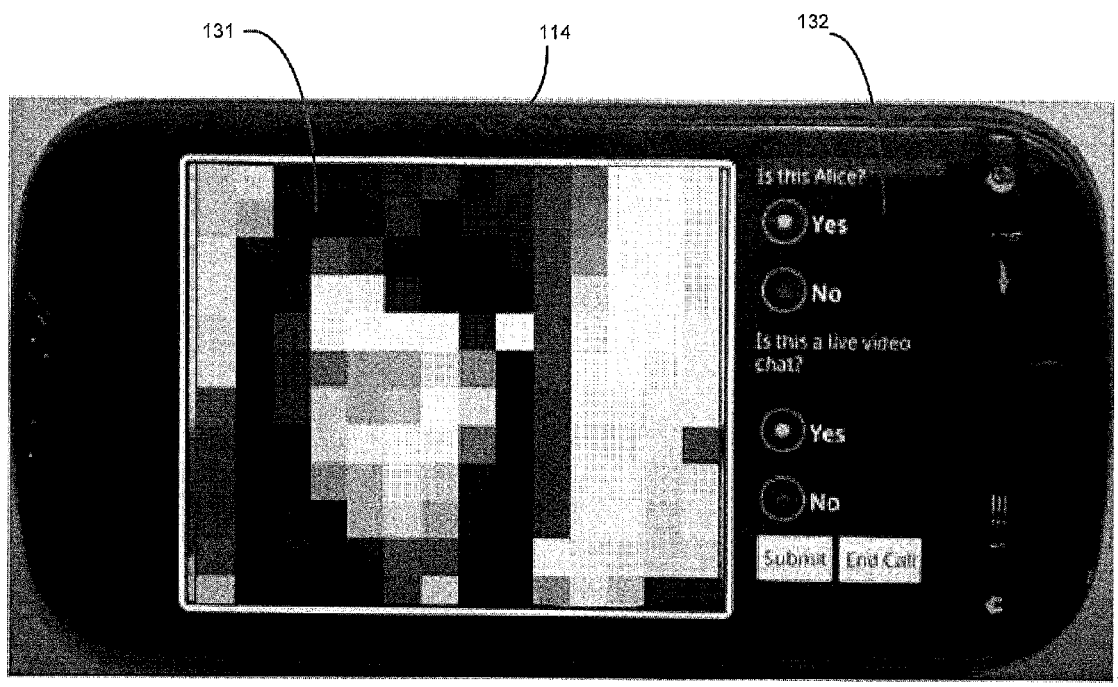
FIG. 4 is a diagram illustrating an exemplary notary interface of a video notarization system used by a named notary (versus by a stranger). The video shows the supplicant (pixelized for anonymity).

Notarization conducted via video-chat by a member of the device owner's social network (vs. by a stranger) presents an interface as pictured in FIG. 4 to the notary. More particularly, notary VNS application 112 may present the user interface illustrated in FIG. 4 to a notary as part of the authentication process. In FIG. 4, the interface includes a supplicant video pane 131, which displays a live video feed from the camera of supplicant device 100. The interface also includes a notarization questions pane 132, which asks the notary to respond to two questions during the video chat, specifically whether this supplicant appears to be the correct device owner and whether the supplicant video appears to be live, i.e., not a recording, which the notary ideally determines by interacting with the supplicant. We discuss this possibility further in Section IV.

The notary interface for use by a stranger, i.e., contacted by way of the VNS cloud service (see Section III-B3), is similar to that pictured in FIG. 4, except that rather than asking "Is this Alice?", the interface allows the notary to toggle between the supplicant video and a pane in which he can rotate through three different photos. (A similar interface is presented in our study in Section IV.) One of these photos will be the certified photograph of the device owner, and the other two will be photographs of others who are of the same gender and race as the device owner (e.g., as specified in the device owner's certificate, along with his photograph). The notary is then asked to identify the photo corresponding to the person in the video, as well as to confirm that the video is live. Our use of a three-photo "lineup" style interface for strangers who are notaries is motivated by studies that indicate that lineups can improve performance in identification tasks (e.g., [35]), but it is not fundamental to our design.

D. System Limitations

There are some limitations of VNS. For instance, we do not provide any defense against malware on supplicant device 100. However, malware protection, such as antivirus protection can be added without departing from the scope of the subject matter described herein. Though the malware will be unable to obtain full private keys protected by VNS, it would nevertheless be able to create signatures or decrypt ciphertexts using those keys, once the device owner was notarized for those actions. That said, a compromise of notary device 114 is of less import, since notary device 114 does not learn the supplicant's device's private key. As such, the compromise of the notary device 114 simply eliminates the second-factor defense that the notary is supposed to provide, reducing the security of the supplicant to one factor (possession of the device). If the display host is compromised, an attacker will be able to see the contents of a TLS session, but he will not be able to obtain the user's private key.

Of course, there are also the social aspects of using VNS, including the overhead of contacting notaries and requiring video chat for authentication. As future work, we plan to perform a field trial of VNS to see just how accepting people are of it.

IV. EFFICACY OF VIDEO-CHAT AUTHENTICATION

Recall that in addition to notarization by members of a device owner's social network, VNS also supports notarization by a stranger. While it is likely that notaries in a supplicant's social network can easily identify the supplicant (e.g., [6]), we wanted to know if strangers could perform this task in the event that notaries in one's social network are unavailable or, as mentioned earlier, in cases where trained notaries in a call-center may be used. We therefore conducted a user study with two goals: (1) to learn how accurately notaries can identify supplicants whom they do not know through a video conversation (by matching the person in the video against a set of photographs); and (2) to learn how reliably a notary can test the liveness of the supplicant, i.e., how well the notary can distinguish a live video of a supplicant from a generated video, including one that is being manipulated to appear responsive to the notary's requests.

The threat model that gives rise to goal (2) is one in which an attacker both obtains a photograph of the owner and steals his device. Commercially available software can enable the attacker to manipulate the photograph to appear dynamic (e.g., causing its eyes and mouth to move as needed), and so it is conceivable that to a stranger, this generated video of the device owner overlaid with the audio of the attacker (so that he can easily respond to notary questions, for example), would be convincing to a notary who is unfamiliar with the supplicant. A goal of our experiment was to evaluate just how convincing such a generated supplicant is.

A. Method

1) Overview of the Study:

Our study comprised a set of experiments. In each experiment a group of notaries were assigned to a room, and a group of supplicants were assigned to a physically separated room. Care was taken to ensure these two groups were assigned randomly and did not interact with each other in person in the experimental facility. This was done to minimize any familiarity we might introduce extraneously and thereby influence the notarization process between strangers.

Each experiment then proceeded through multiple rounds in which notaries and supplicants were paired up for video chat. In each such pairing, the notary was instructed to identify the supplicant by matching the supplicant's face to one of three images. There was also a "None" image which could be selected if the notary believed the supplicant was not present in the photo set. The supplicant's photo was always present in the set, but the notaries were not made aware of this fact. The notary was also instructed to test for liveness. We left it up to the individual notaries to decide how to determine if the video was of a live and present supplicant and encouraged them to be creative in this endeavor. When satisfied, the notary answered a brief questionnaire to indicate his/her degree of confidence in his selected photo and that the supplicant's video represented a live and present supplicant. Using the chosen photo and the liveness confidence we are able to determine the identification rate.

To measure the misidentification rate we challenged notaries with custom avatars that were manipulated to be responsive to notary interaction. The avatars in these video feeds were created from photos of supplicants who were not part of the current lab session. We instructed the supplicants who were controlling these avatars to act naturally during these chats and to try to convince the notary that they were in fact the person in the video feed. The avatar chats were made to appear identical to the live chats, the only exception being that the notary (unbeknownst to them) was speaking to a supplicant who was not the person depicted in the video they were seeing. The photo set viewed by the notary included an image of the supplicant whose avatar appeared in the video feed, since this was meant to mimic an impersonation attack where fabricated video might be used in an attempt to match a device owner's certified photo.

2) Study Implementation:

Obtaining Images:

As part of the recruitment process, participants were asked to submit three photos of themselves. From this collection of images, a photo set was created for each participant containing one photo of them and photos of two other participants. Our goal was to create sets of images where all three people were similar in appearance in order to test the notary's ability to make a correct identification. An attempt was made to match gender, ethnicity, age, hair color, etc. whenever possible. This was sometimes challenging, for one because there were more than twice as many female participants than male, and also because we were limited in our choice of the two additional photos to participants who would not be present at the current lab session. For instance, if a notary viewed a photo set containing a photo of the person seated next to them, they could automatically eliminate that person from consideration when making their decision. Also note that a photo set had to be created for every participant since we had no way of knowing ahead of time who would be a notary or a supplicant during any given experiment (see below).

Lab Setup and Group Assignment:

Upon arriving at our lab site, the participants were alternately sent to two different labs in order to divide them as evenly as possible into notaries and supplicants and to provide a randomized assignment to the supplicant or notary groups. The notary lab was equipped with five desktop computers, each of which had an attached headset with microphone. The supplicant lab also had five computers, each with an attached webcam, microphone, and speaker. (Supplicants were not provided headsets, since headsets would obscure the supplicants' physical appearance to the notaries.) Both rooms had group-specific FAQ sheets placed next to each computer as well. Before the start of each lab session, members of our study team gave each group a brief introduction outlining the purpose of the study and detailing their role as notary or supplicant.

Minimizing Extraneous Participant Interactions:

Participants were told to arrive in the lobby of our building where they would then be directed to the appropriate room by a member of our study team. To avoid accidental interaction between the groups, each participant was given a map with a highlighted path to their room, using separate hallways and stairwells for each group. As another precaution, notaries and supplicants were presented with a question immediately following each chat which asked whether they had ever interacted with the person they just chatted with before that day. We collected this data so that we could exclude any such chat pairings from our analysis in an effort to ensure that we were only looking at notarization between strangers (as a result, 2 out of 80 chats were excluded from consideration).

Figure 5:
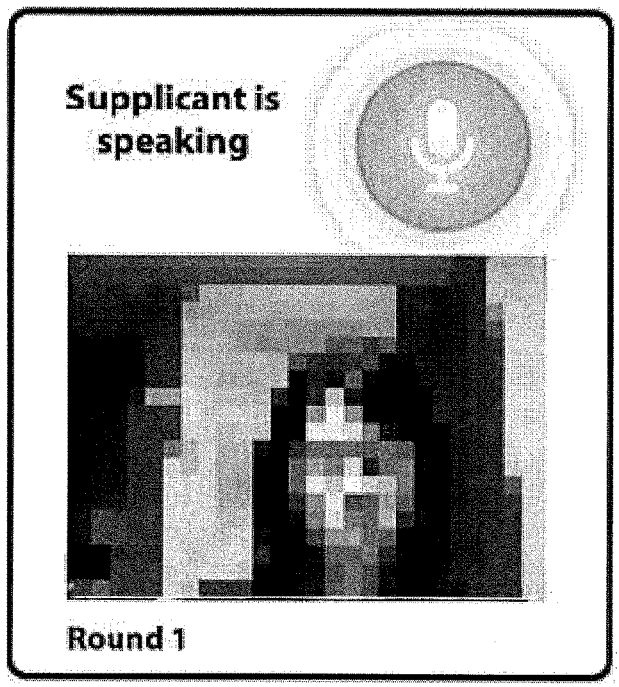
FIG. 5 is a diagram illustrating a notary user interface in the user study described in section 4. The video interface in FIG. 5 shows the supplicant (pixelized for anonymity). The microphone circle is red while the supplicant presses the key to talk. The microphone circle is blue when neither party is pressing the key. The microphone circle is green while (only) the notary presses a key to talk. As the instructions indicate, the notary can toggle between the live video screen and three photos of the same size as the video. The notary cycles through these three photos using the up/down arrow keys. The notary indicates her identification of the supplicant by pressing Y while the intended photo is displayed.

Study Interface:

At the start of each experiment, participants viewed a short walkthrough video detailing their role (either notary or supplicant) and the usage of their group's video-chat software. The supplicant's software sent both video and audio feeds to the notary with whom he was interacting, while the notary software sent audio only. The notary interface is shown in FIG. 5. Both systems utilized a push-to-talk interface including an onscreen indicator to show which (if any) side was currently speaking; the reason for this choice is described below. Notaries were told to interact with the supplicant and compare their video feed to the provided photoset in order to verify the supplicant's identity and to verify that the video feed is of a live and present supplicant (versus a recording, for example). The first round was used for practice and could be repeated if desired. This was done to ensure that participants were comfortable using the software. The data from this first round was not used in our later analysis.

The specific assertions presented to the notary after he selected a photo that he believed to be the supplicant were:

"I am sure this photo matches the person in the video."

"I am sure this was a live conversation and not a recording."

To each, the notary responded on a Liked scale with values "Strongly disagree", "Disagree", "Neutral", "Agree", and "Strongly agree".

The supplicant's user interface is similar to the notary's, with three important exceptions. First, the supplicant interface shows the video of the supplicant, not of the notary, so that the supplicant can see what the notary is seeing. (Recall that notarization by strangers involves video in only one direction but audio in both.) Second, the instructions on the right half of the screen were unnecessary for the supplicant, since the supplicant has no controls to manipulate during the notarization process. Third, of course the supplicant was not posed the above questions at the end of a round.

The notary's interface, in particular, was adapted to reflect technical limitations that would be typical of video-chatting over mobile devices. For example, the notary's video display was limited to a size approximately that of a modern smart-phone screen. Moreover, we inserted randomly generated "freezes" and "skips" into the video to mimic glitches typical of live video chats today. To produce these effects, we randomly applied one of two custom filters to the video display. Both filters applied a slight pixelation to the video, and one inserted approximately half-second pauses every 12 seconds on average while the other inserted approximately one-second pauses every 8 seconds on average.

Avatar Creation:

We used the SitePal service [36] to create avatars based on photos of participants from other lab sessions. A photo of the supplicant lab was used as the background image for the avatars so that they would not appear different from the live supplicant video feeds. The avatars were controlled by a supplicant whose real voice was heard by the notary even though the video feed was falsified. As described in Section IV-A2 supplicants were habituated to use a push-to-talk system for speech, and these inputs caused the lips of the avatar to move while the supplicant was speaking. We created both male and female avatars and ensured that the gender of the avatar matched that of the controlling supplicant.

Study Orchestration:

After each participant viewed the walkthrough video, they entered their assigned participant ID number into our software's web interface to join the session. Once everyone had joined, one of the study team members would start the session via an administrative web interface. Starting the session in this manner was necessary in order to create the notary-supplicant pairings based on who actually showed up to the experiment. When making these pairings, the software also made sure that each notary would see one avatar during a random round (after the first round), and that each supplicant would act in the avatar role at most one time. The software also made it possible to repeat the first (practice) round if either side chose to do so, and also automatically advanced through the rounds once all the chats for the current round were completed.

Software Implementation Notes:

We implemented our study software as a Google Web Toolkit application with a MySQL backend. The video chat component was written in Actionscript and embedded in the web interface as a Flash movie. We used the open source Red5 Media Server [37] to relay the video and audio streams and various other inputs to control the push-to-talk interface, the round changes, and the avatar actions.

3) Study Procedures:

Recruitment:

Study participants were recruited via flyers placed in several high-traffic areas on a university campus (anonymized) and email announcements sent to a campus listserv. To be eligible for the study, participants must have been born in the United States, lived in the United States at least through high school, and be at least 18 years of age. The United States restriction was put in place to limit variation in speaking accents since supplicants would sometimes be required to impersonate others and we wanted these situations to appear as natural as possible. Interested participants were directed to our website where they were asked to submit three face images of themselves taken on three different occasions, and to sign up for a time when they could visit our lab to participate in a video chat experiment. Potential participants were offered $20 for completing one of these experiments, or a prorated amount if they terminated the study early. 97 people filled out this form and due to scheduling constraints we were able to invite 74 of them to come to one of our scheduled lab sessions. Of the 74 that we invited, 62 actually showed up for an experiment.

Participant Demographics:

One of our experiments, with 6 participants, experienced a software malfunction and thus our results are based on experimental data gathered from 56 participants (26 notaries and 30 supplicants). Of our 56 participants, 15 were male and 41 were female. 88% of the participants were age 25 or under. 53% of the participants identified themselves as Caucasian, 30% as African American, and 14% as Asian. 53% of the supplicants identified as Caucasian, 30% as African American, and 13% as Asian. Of the notaries, 54% identified as Caucasian, 31% as African American, and 15% as Asian.

Ethical Considerations:

Our user study was approved by the university's (anonymized) Institutional Review Board (IRB).

B. Findings

1) Identification Accuracy:

Our primary measures of participant performance in our user study were their true and false identification rates. Recall that identification here involved two facets: selection of the correct supplicant photograph and confidence that the video session was a live representation of that supplicant. Since each aspect was given a confidence score by the notary at the end of the round, we needed some way to combine these scores to determine whether the notary's responses indicated sufficient confidence to declare the supplicant notarized. Specifically, we mapped the Likert-scale responses to numeric values ("Strongly disagree"$\rightarrow -2$, "Disagree"$\rightarrow -1$, "Neutral"$\rightarrow 0$, "Agree"$\rightarrow 1$, and "Strongly agree"$\rightarrow 2$) and defined the notary's score to be the minimum of his expressed photo confidence and his liveness confidence. We define the true identification rate (TIR) to be the fraction of video chats with live supplicants after which the notary selected the supplicant's photograph and registered a score (as just defined) of at least a specified threshold t. The false identification rate (FIR) is then the fraction of video chats with supplicant avatars after which the notary selected the photograph matching the avatar and registered a score of at least t.

Figure 6:
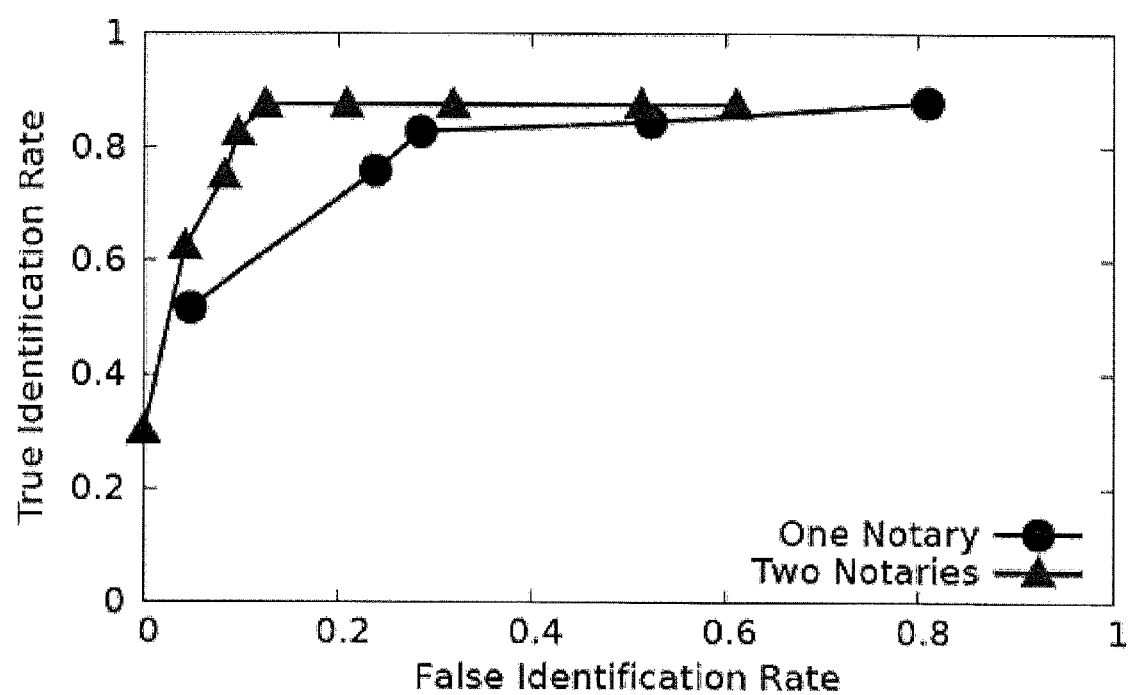
FIG. 6 is a graph of a receiver operating characteristic (ROC) curve illustrating the true identification rate versus the false identification rate in the user study described in section 4.

The "One Notary" ROC curve in FIG. 6 then results by varying t in the range $[-2, 2]$. For example, setting t=2 yields a TIR of over 50% and simultaneously an FIR of roughly 5%. On the other end of the spectrum, setting t=−2 yields a TIR of over 85% but also an FIR of roughly 80%. A balance point, i.e., at which $1-\text{TIR} \approx \text{FIR}$, comes at around t=1, in which case $1-\text{TIR} \approx \text{FIR} \approx 24\%$.

We also show a "Two Notaries" ROC curve in FIG. 6 that is constructed by combining the scores from each pair of video chats by two notaries with the same supplicant (or avatar based on the same human supplicant) in our study. Specifically, for each such pair of video chats, the scores of the two notaries were summed and compared to a threshold t, now ranged over $[-4, 4]$. As before, a combined score of at least t resulted in an identification for the purposes of computing a TIR and FIR. As FIG. 6 shows, employing a pair of notaries in this way improves the ROC curve so that, e.g., its balance point at t=0 yields $1-\text{TIR} \approx \text{FIR} \approx 12\%$.

2) Liveness Testing:

One of the more interesting aspects of our study was learning how notaries would determine that they were speaking with a real person, i.e., that the supplicant was live and present. Note that we did not give participants any insight into the specific form of attack that our study attempted, i.e., one with live human audio overlaid on a manufactured video. Therefore, it is not surprising that some notaries adopted strategies that would be ineffective against this form of attack, as indicated in their responses to the post-study question, "What did you do to ensure that a live supplicant was present?" For example, most of the ineffective strategies tested (at best) only the liveness of the audio (but not of the video):

"Ask what time it was, attempted to ask questions that would be difficult to give a stock answer to"

"Asked questions about the present, like if they had a test etc."

"Ask questions that were not just yes or no answers."

Despite such cases, the majority of answers to this question indicated that notaries recognized the need to determine the liveness of both the audio and the video either initially or once something about the video alerted them. For example:

"Had a conversation, told jokes to see if they laughed. Maybe my jokes are just bad?"

"I asked the time and I asked them to make a funny face. My thought was that it tested both the live-ness' of the audio and the video."

"Ask them simple questions and ask them to do things like wave their hand over their head"

3) User Acceptance:

In a questionnaire at the end of their participation in the study, the participants indicated that they were comfortable interacting through video chat ("Strongly Agree" (SA): 10, "Agree" (A): 30, "Neither Agree nor Disagree" (NA): 6, "Disagree" (D): 6, "Strongly Disagree" (SD): 4). More specifically, the overwhelming majority of supplicants indicated that they were comfortable seeking identification from another person through video chat (SA: 5, A: 13, NA: 9, D: 2, SD: 1). When asked to rate identification through video, both notaries and supplicants were very positive ("Very good": 5, "Good": 31, "Neither Good nor Bad": 18, "Bad": 2, "Very Bad": 0). When asked how often they have video conversations, most participants responded on the more-often side of the spectrum ("Often": 13, "Sometimes": 24, "Rarely": 14, "Never": 5).

Written responses from the participants indicated a degree of awkwardness in many cases, though this seemed to differ somewhat between notaries and supplicants. In part, this may have been due to the one-wayness of the video stream. For example, one notary wrote, "It (oddly) was more comfortable knowing that I could see them, but they couldn't see me." In contrast, one supplicant noted, "It was just a little odd because I couldn't see the other person," and another said, "I usually feel uncomfortable chatting where someone can see me, but I can't see them."

A number of other useful insights came from the participant responses. For example, one notary indicated that it would have been helpful to have more photos to which to compare:

> I think it is easy to identify someone through a video, it may just be hard to know is they match one certain photograph. If i was given ten pictures of a person I could definitely tell which set belonged to which video chat person Another notary pointed out that ethnicity impacted his ability to correctly identify supplicants (though we presume he meant race, not ethnicity): "It's harder to identify those of other ethnicities than my own." In fact, it is well-known that people better recognize faces of people from their own races than from other races [38]-[40]. When using strangers as notaries, it may thus be advisable to utilize strangers of the same race as the supplicant, which could be encoded in the supplicant's certificate.

C. Implications

The takeaway messages from our user study, we believe, are threefold. First, notarization by strangers is an imperfect defense, though it clearly provides a more useful middle ground than disallowing notarization entirely (the equivalent of a zero TIR) when no notary in a supplicant's social network is available. Our study suggests that when using a single stranger as a notary, careful thought should be given to selecting an appropriate confidence threshold. A threshold can be chosen to strike a balance between TIR and FIR, though for many practical uses it may be acceptable to decrease this threshold to improve the TIR with a corresponding detriment to the FIR. This tradeoff may be particularly attractive if the threat model under which we evaluated the FIR is considered more advanced than would be common. Our results also suggest the alternative of using two notaries, which generally yields better results than one notary but also comes with increased inconvenience. Other possible improvements suggested by participants include utilizing more photos per supplicant and utilizing a notary of the same race as the supplicant.

Though the true identification rates are not as high as we would like, recall that reliance on strangers for video notarization would generally be a "last resort" for when no notary from within the supplicant's social network is available. The false identification rates also fall short of the ideal, but recall that this measure represents the most difficult case for VNS: an attacker who steals a device, uses a photograph of the owner and state-of-the-art software to create a life-like avatar for the owner, and then accesses a resource for which "Anyone" is an allowable notary. Moreover, to prevent the attacker from trying strangers repeatedly until one assents, the VNS service can suspend the device after some number of consecutive notary rejections.

A second takeaway message is that while several notaries figured out effective measures to test the liveness of both the audio and video, some did not. As such, more explicit instruction to guide the notary in testing the liveness of both the video and audio would be beneficial.

Third, we found that the participants in our study were generally comfortable with authentication through video chat, perhaps in part because many were already participating in video chats in their lives outside of our study. We believe this bodes well for the potential for a system like VNS to be accepted by users, though their comments also shed light on potential improvements to the system.

D. Limitations of the Study

There are, of course, several limitations of our study. Like most studies, our participants may not represent the general population; ours were presumably mostly affiliated with our university in some fashion, for example. The extent to which our results generalize to the broader population is unclear, though since the duties of a notary rely on interpersonal interaction skills that people of all walks of life exercise on a daily basis, we would expect that our study might generalize quite well.

A natural concern about using strangers as notaries is the possibility that notaries will not take their responsibility seriously. Our study did not address this issue, and we did observe varying levels of commitment on the part of the notaries. We leave as future work the design incentive schemes to motivate notaries to do a good job.

A third limitation of our study is that the avatars we constructed, though reasonably effective, were not perfect and presumably were well below the state-of-the-art of modern video and audio production. It seems likely that with access to modern tools and expertise in special effects and animation, and with enough patience and motivation, an attacker could construct a video representation of nearly anyone that would fool a stranger (though perhaps not a friend). Nevertheless, we believe that notarization substantially raises the bar for all but very targeted attackers.

V. CONCLUSION

We have introduced the concept of "notarization", a process where a remote entity can verify via video chat who is in physical possession of a mobile device as a necessary condition for the device to make use of its credentials. We implemented VNS, an Android application using notarization to protect cryptographic keys used for decrypting on-device data or signing in support of client-side TLS. Since VNS requires no server-side changes, users can proactively decide which services and data they wish to protect using it. Through a detailed user study, we also evaluated the possibility of extending the notary role to users outside of one's social network. While not a perfect defense, we believe that strangers as notaries are still viable as a last resort when no notary in a supplicant's social network is available, considering that the threat model in our evaluation is likely more advanced than would be common.

Exemplary System for Providing Video Notarization

Figure 7:
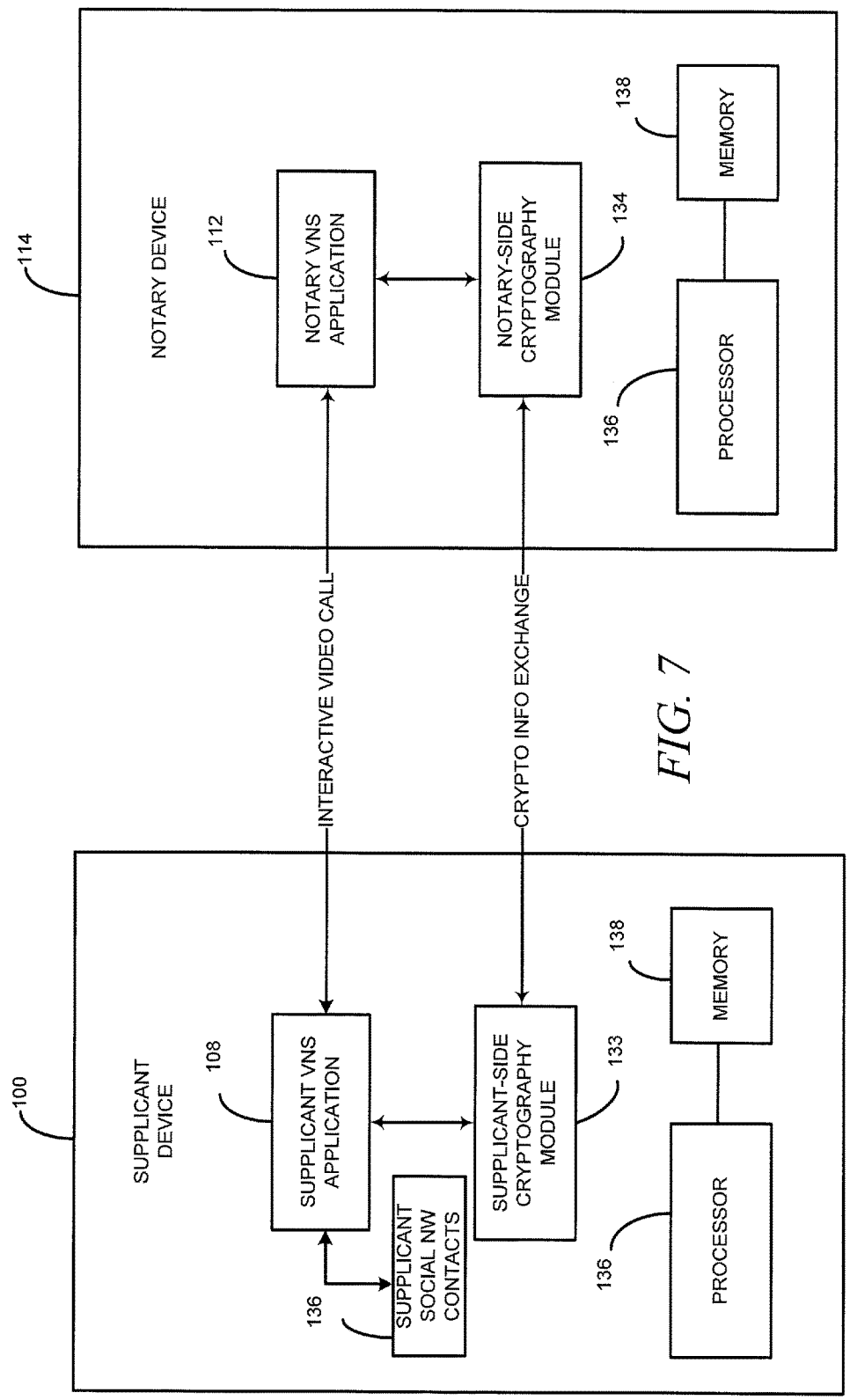
FIG. 7 is a block diagram illustrating a system for combating device theft using a video notarization system according to an embodiment of the subject matter described herein.

As described above, the subject matter described herein can be implemented using a supplicant VNS application and a notary VNS application. FIG. 7 is a block diagram of an exemplary system for implementing the subject matter described herein. Referring to FIG. 7, supplicant device 100 includes supplicant VNS application 108 and a supplicant side cryptography module 133. Notary device 114 includes notary VNS application 112 and a notary side cryptography module 134. Supplicant device 100 and notary device 114 may each be any one of a mobile phone, a tablet computer, a desktop computer, a laptop computer, a gaming console, or any other device capable of executing applications and communicating with other devices over a network. Supplicant VNS application 108 performs the steps described herein for the supplicant to initiate an interactive video call with the notary, to manage notary services for different protected resources, and to select notaries. In one embodiment supplicant VNS application 108 selects notaries using social networking contacts 136 of the supplicant, which may be stored on supplicant device 100 and/or in cloud storage accessible by supplicant device 100.

In response to receiving confirmation of successful video authentication of the supplicant, supplicant VNS application 108 may provide or facilitate access to a protected resource, such encryption keys, passwords, emails, text messages, contact lists or other information stored on supplicant device 100 or accessible via supplicant device 100. Supplicant side cryptography module 133 performs the operations described herein for supplicant side access to a protected resource once the interactive video authentication is successful. Notary side cryptography module 134 may present supplicant side cryptography module 133 with a capability, such as a key, valid for a notarization interval for accessing a protected resource. Supplicant side cryptography module 133 sends a message with the capability to notary side cryptography module 134. Notary side cryptography module 134 partially signs the message with its share of a key that is cryptographically shared with supplicant side cryptography module 133. Supplicant side cryptography module 133 may complete the signature of the message that is partially signed by notary side cryptography module 134 using its share of the private key.

Notary VNS application 112 performs the steps described above for allowing a notary to identify a supplicant and confirm that video of the supplicant is live via an interactive video call. Notary VNS application 112 may also, upon successful authentication of the supplicant, instruct notary side cryptography module 134 to perform the notary side cryptographic functions for furthering access to a protected electronic resource. In one implementation, notary VNS application 112 may provide a graphical user interface for the notary to receive a video call from the supplicant, view video of the supplicant, to indicate whether the supplicant is who the supplicant purports to be, and to indicate whether the video of the supplicant is live. For the case where the notary does not know the supplicant, the graphical user interface may display images of the supplicant for the notary to view and match to the video of the supplicant.

In one embodiment, notary side cryptography module 134 may perform the notary side cryptographic operations upon successful authentication of the supplicant by the notary. For example, as described above, notary side cryptography module 134 may partially sign a message received from supplicant side cryptography module 133 using its share of the private key that is cryptographically shared with supplicant side cryptography module 133.

Supplicant device 100 and notary device 114 may each include a processor 136, at least partially implemented in hardware, and a memory 138 for executing and storing the various modules and applications illustrated in FIG. 7. Cryptography modules 133 and 134 may be executed by processors 136 or by separate processors which are secure and dedicated to performing cryptographic functions.

In the embodiment illustrated in FIG. 7, supplicant device 100 interacts directly with notary device 114. However, as described above, in an alternate embodiment, supplicant device 100 may instruct a proxy to interact with notary device 114. The above-described VNS protocol can be used to protect any suitable electronic resource, including passwords, user IDs, cryptographic keys, account information, or any other suitable electronic resource that is desirable to protect.

Figure 8:
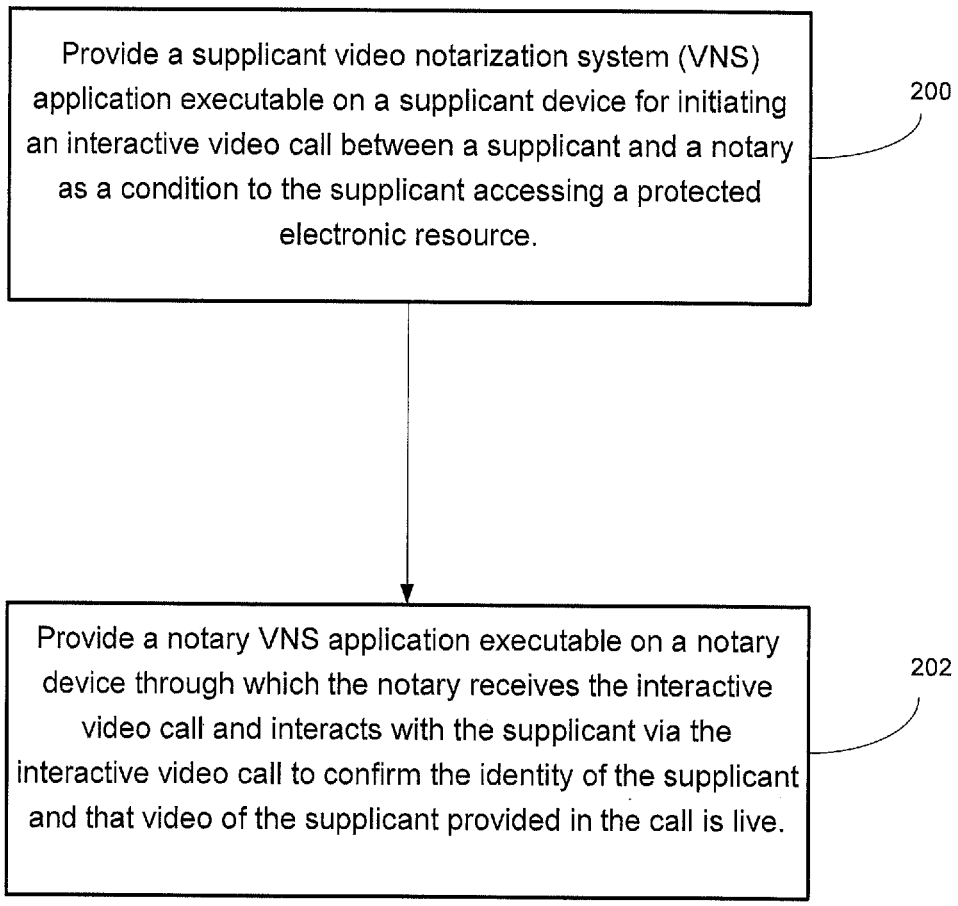
FIG. 8 is a flow chart illustrating an exemplary process for combating device theft using a video notarization system according to an embodiment of the subject matter described herein.

FIG. 8 is a flow chart illustrating an exemplary process for controlling access to an electronic resource using interactive video notarization. Referring to FIG. 8, in step 200, a supplicant VNS application executable on a supplicant device for initiating an interactive video call between a supplicant and a notary as a condition to the supplicant accessing a protected electronic resource is provided. For example, supplicant VNS application 108 may be provided for executing on a mobile device, such as supplicant device 100. Supplicant VNS application 108 may initiate a video call between the supplicant and a notary for the supplicant to access a protected electronic resource, such as device 100 or an account accessible through device 100.

In step 202, the method includes providing a notary VNS application executable on a notary device through which the notary receives the interactive video call and interacts with the supplicant via the interactive video call to confirm the identity of the supplicant and that the video of the supplicant provided in the call is live. For example, notary VNS application 114 may be provided on a notary's computing device through which a notary verifies the identity of the supplicant and that the video of the supplicant is live.

While VNS is described above as useful protecting sensitive information stored on a mobile device, other application as possible without departing from the scope of the subject matter described herein. We have thus identified the following additional applications for VNS:

Guarding transactions: A member of the user's social network could be placed on the critical path of certain types of transactions, such as a funds transfer or purchase larger than a certain amount. In this usage scenario, the notary's consent is sought simply to give the notary the opportunity to notice something amiss, such as a purchase being made in a location where she knows the user not to be. Similarly, a notary's approval might suffice to defer a bank's suspension of a credit card for unusual activity. Notarizing a transaction presumably requires sharing some information about the transaction with the notary, raising privacy concerns. We believe it will be interesting to explore the intersection of those potential notaries that (i) have sufficient familiarity with the user to provide a reasonable notary service, and (ii) are sufficiently trusted by the supplicant to disclose information about these transactions to them. Moreover, notarizing a transaction is a far more nuanced decision than simply deciding whether a person in a video chat is familiar to the notary or appears to be the same person as in a certified photo. We expect these and other considerations will substantially change the supplicant/notary dynamics and raise interesting questions about the viability of this approach that we plan to resolve.

Protecting installation: An application for VNS is placing one or more members of one's social network on the critical path of installing new software on a device. While the preceding examples primarily leverage the notary's familiarity with the user, this example would additionally leverage the experience of any members of the user's social network with the same software and potentially any expertise that any members have regarding the safety of the software. In this case, the mediator might be only a distant acquaintance, but one who agrees to periodically educate others about risks associated with this application (or applications requesting a certain set of permissions), analogous to a pharmacist who makes sure a person knows about the risks of medications they have been prescribed. Once again, we believe this example of VNS raises its own interesting questions. One is how to motivate persons with expertise to occasionally share that expertise with others, particularly as the required expertise becomes more specialized and so possessed by fewer people. Another is whether persons would be willing to consult someone with expertise before they install an application. These and other such questions will be central to our investigations.

The disclosure of each of the following references is incorporated herein by reference in its entirety.

REFERENCES

[1] C. Tryhorn, "Nice talking to you . . . mobile phone use passes milestone," *The Guardian*, Mar. 3, 2009, available at http://www.guardian.co.uk/technology/2009/mar/03/mobile-phones 1.

[2] A. Smith, "Nearly half of American adults are smartphone owners," Pew Research Center, Tech. Rep., 2012.

[3] R. Ccllan-Jones, "Government calls for action on mobile phone crime," *BBC News*, Feb. 11, 2010, available at http://news.bbc.co.uk/2/hi/technology/8509299.stm.

[4] K. Komando, "Lost or stolen smartphone? Find and erase it remotely," *USA Today*, Nov. 12, 2009, available at http://www.usatoday.comitech/columnistildmkomando/2009-11-12-lostsmartphones_N.htm.

[5] P. MacKenzie and M. K. Reiter, "Networked cryptographic devices resilient to capture," *International Journal of Information Security*, vol. 2, no. 1, pp. 1-20, 2003.

[6] V. Bruce, Z. Henderson, C. Newman, and A. Burton, "Matching identities of familiar and unfamiliar faces caught on cctv images," *Journal of Experimental Psychology-applied*, vol. 7, pp. 207-218, 2001.

[7] B. Soleymani and M. Maheswaran, "Social authentication protocol for mobile phones," in *2009 International Conference on Computational Science and Engineering*, August 2009, pp. 436-441.

[8] J. Zhan and X. Fang, "Authentication using multi-level social networks," in *Knowledge Discovery, Knowledge Engineering and Knowledge Management, First International Joint Conference*, October 2009, pp. 35-49.

[9] J. Brainard, A. Juels, R. Rivest, M. Szydlo, and M. Yung, "Fourth factor authentication: Somebody you know," in *13th ACM Conference on Computer and Communications Security*, 2006, pp. 168-178.

[10] S. Schechter, S. Egelman, and R. Reeder, "It's not what you know, but who you know—a social approach to last-resort authentication," in *27th ACM Conference on Human Factors in Computing Systems*, April 2009.

[11] A. M. Burton, S. Wilson, M. Cowan, and V. Bruce, "Face recognition in poor-quality video: Evidence from security surveillance." *Psychological Science, vol.* 10, no. 3, pp. 243-248, 1999.

[12] V. Bruce, Z. Henderson, C. Newman, and A. M. Burton, "Verification of face identities from images captured on video," *Journal of Experimental Psychology-applied*, vol. 5, pp. 339-360, 1999.

[13] G. E. Pike, R. I. Kemp, N. A. Towell, and K. C. Phillips, "Recognizing moving faces: The relative contribution of motion and perspective view information," *Visual Cognition*, vol. 4, no. 4, pp. 409-438, 1997. [Online]. Available: http://www.tandfonline.com/doi/abs/10.1080/713756769

[14] Bank of America safepass. [Online]. Available: http://www.bankofamerica.com/privacy/index.cfm?template=learn_about safepass

[15] Google 2-step verification. [Online]. Available: https://support.google.com/accounts/bin/topic.py?hl=en&topic=28786&parent=2373945&ctx=topic

[16] R. Ch, R. Jammalamadaka, T. W. V. D. Horst, and S. Mehrotra, "Delegate: A proxy based architecture for secure website access from an untrusted machine," in *Proceedings of 22nd Annual Computer Security Applications Conference (ACSAC*, 2006.

[17] M. Wu, S. Garfinkel, and R. Miller, "Secure web authentication with mobile phones," in *DIMACS Workshop on Usable Privacy and Security Software*, 2004.

[18] T. Dirks and E. Rescorla, "The transport layer security (TLS) protocol, version 1.2," IETC RFC 5246, August 2008.

[19] P. MacKenzie and M. K. Reiter, "Delegation of cryptographic servers for capture-resilient devices," *Distributed Computing*, vol. 16, no. 4, pp. 307-327, 2003.

[20] J. M. McCune, A. Perrig, and M. K. Reiter, "Seeing-Is Believing: Using camera-phones for human-verifiable authentication," *International Journal on Security and Networks*, vol. 4, no. 1-2, pp. 43-56, 2009.

[21] L. Bauer, S. Ganiss, J. M. McCune, M. K. Reiter, J. Rouse, and P. Rutenbar, "Device-enabled authorization in the Grey system," in *Information Security: 8th International Conference, ISC* 2005, ser. Lecture Notes in Computer Science, vol. 3650, 2005, pp. 431-445.

[22] "PKCS #10: Certification request syntax standard," http://www.rsa.com/rsalabs/node.asp?id=2132.

[23] M. Bellare, A. Boldyreva, A. Desai, and D. Pointcheval, "Key-privacy in public-key encryption," in *Advances in Coptology—Asiacopt* 2001 *Proceedings*, ser. Lecture Notes in Computer Science, vol. 2248, 2001.

[24] [Online]. Available: http://developer.android.com/sdk/index.html

[25] [Online]. Available: http://developer.android.com/tools/sdk/ndk/index.html

[26] [Online]. Available: http://www.igniterealtime.org/projectssmack/

[27] [Online]. Available: http://www.gnu.org/software/libgcrypt/

[28] [Online]. Available: http://www.webrtc.org/

[29] [Online]. Available: https://developers.google.com/talk/libjingle/

[30] [Online]. Available: http://crypto.stanford.edu/ssl-mittn/

[31] [Online]. Available: http://openjdk.java.net/

[32] [Online]. Available: https://developers.google.com/web-toolkit/

[33] [Online]. Available: http://code.google.com/p/zxing/

[34] [Online]. Available: http://jwebsocket.org/

[35] A. D. Yarmey, A. L. Yarmey, and M. J. Yarmey, "Face and voice identifications in showups and lineups," *Applied Cognitive Psychology*, vol. 8, no. 5, pp. 453-464, October 1994.

[36] Sitepal. [Online]. Available: http://www.sitepal.com

[37] [Online]. Available: http://www.red5.org/

[38] T. Valentine and M. Endo, "Towards and examplar model of face processing: The effects of race and distinctiveness," *Quarterly Journal of Experimental Psychology*, vol. 44, 1992.

[39] D. Levin, "Race as a visual feature: Using visual search and perceptual discrimination tasks to understand face categories and the cross race recognition deficit," *Quarterly Journal of Experimental Psychology: General*, vol. 129, no. 4, 2000.

[40] P. Walker and W. Tanaka, "An encoding advantage for own-race versus other-race faces," *Perception*, vol. 23, 2003.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for controlling access to an electronic resource using interactive video notarization, the method comprising:
   providing a supplicant video notarization system (VNS) application executable on a supplicant device for initiating an interactive video call between a supplicant and a notary as a condition to the supplicant accessing a protected electronic resource stored locally on a mobile device, wherein the supplicant VNS application is configured to select the notary from social networking contacts of the supplicant; and
   providing a notary VNS application executable on a remote notary device through which the notary receives the interactive video call and interacts with the supplicant via the interactive video call to confirm an identity of the supplicant and that video of the supplicant provided in the interactive video call is live, wherein the notary VNS application includes an interface that requires the notary to indicate whether the supplicant appears to be a correct owner of the mobile device based on the interactive video call in order to prevent reverse-engineering credentials of the owner.

2. The method of claim 1 wherein the supplicant VNS application is configured to prompt the supplicant to select a notary.

3. The method of claim 1 wherein the supplicant VNS application is configured to select a notary from a group of notaries not known to have knowledge of the supplicant.

4. The method of claim 1 comprising, in response to successful confirmation of the identity of the supplicant and that the video of the supplicant is live, providing cryptographic information to the supplicant device that provides or facilitates access to the protected electronic resource.

5. The method of claim 4 wherein the cryptographic information includes at least one cryptographic key.

6. The method of claim 4 wherein providing cryptographic information includes partially signing a message using a share of a private key that is cryptographically shared between the supplicant device and the notary device and forwarding the partially signed message to the supplicant device for completion of signing of the message by the supplicant device using a share of the private key maintained by the supplicant device.

7. The method of claim 1 wherein the supplicant device interacts directly with the notary device.

8. The method of claim 1 wherein the supplicant device interacts with the notary device via a proxy separate from the supplicant device.

9. The method of claim 1 wherein the protected electronic resource comprises information for accessing a website.

10. The method of claim 1 wherein the protected electronic resource comprises information for accessing a device.

11. The method of claim 1 wherein the protected electronic resource comprises text messages, email, or contact lists maintained by the supplicant device.

12. The method of claim 1 wherein the supplicant VNS application includes a graphical user interface used to display selectable indicators for a plurality of different websites or devices and a manage notaries interface through which the supplicant can configure notaries for the different websites or devices.

13. The method of claim 1 wherein the notary VNS application includes a graphical user interface for displaying a video feed of the supplicant to the notary.

14. A system for controlling access to an electronic resource using interactive video notarization, the system comprising:
    a supplicant video notarization system (VNS) application stored in memory and executable by one or more processors on a supplicant device for initiating an interactive video call between a supplicant and a notary as a condition to the supplicant accessing a protected electronic resource stored locally on a mobile device, wherein the supplicant VNS application is configured to select the notary from social networking contacts of the supplicant; and
    a notary VNS application executable on a remote notary device through which the notary receives the interactive video call and interacts with the supplicant via the interactive video call to confirm an identity of the supplicant and that video of the supplicant provided in the interactive video call is live, wherein the notary VNS application includes an interface that requires the notary to indicate whether the supplicant appears to be a correct owner of the mobile device based on the interactive video call in order to prevent reverse-engineering credentials of the owner.

15. The system of claim 11 wherein the supplicant VNS application is configured to prompt the supplicant to select a notary.

16. The system of claim 14 wherein the supplicant VNS application is configured to select a notary from a group of notaries not known to have knowledge of the supplicant.

17. The system of claim 14 comprising a notary side cryptography module for providing cryptographic information to the supplicant device that furthers access to the protected electronic resource.

18. The system of claim 17 wherein the cryptographic information includes at least one cryptographic key.

19. The system of claim 17 wherein the notary side cryptography module is configured to partially sign a message using a share of a private key that is cryptographically shared between the supplicant device and the notary device and forward the partially signed message to the supplicant device for completion of signing of the message by the supplicant device using a share of the private key maintained by the supplicant device.

20. The system of claim 14 wherein the supplicant device interacts directly with the notary device.

21. The system of claim 14 wherein the supplicant device interacts with the notary device via a proxy separate from the supplicant device.

22. The system of claim 14 wherein the protected electronic resource comprises information for accessing a website.

23. The system of claim 14 wherein the protected electronic resource comprises information for accessing a device.

24. The system of claim 14 wherein the protected electronic resource comprises email, text messages, or contact lists maintained by the supplicant device.

25. The system of claim 14 wherein the supplicant VNS application includes a graphical user interface used to display selectable indicators for a plurality of different websites or devices and a manage notaries interface through which the supplicant can configure notaries for the different websites or devices.

26. The system of claim 14 wherein the notary VNS application includes a graphical user interface for displaying a video feed of the supplicant to the notary.

27. A non-transitory computer readable medium having stored thereon executable instructions that when executed by the processor of a computer control the computer to perform steps comprising:

providing a supplicant video notarization system (VNS) application executable on a supplicant device for initiating an interactive video call between a supplicant and a notary as a condition to the supplicant accessing a protected electronic resource stored locally on a mobile device, wherein the supplicant VNS application is configured to select the notary from social networking contacts of the supplicant; and providing a notary VNS application executable on a remote notary device through which the notary receives the interactive video call and interacts with the supplicant via the interactive video call to confirm an identity of the supplicant and that video of the supplicant provided in the interactive video call is live, wherein the notary VNS application includes an interface that requires the notary to indicate whether the supplicant appears to be a correct owner of the mobile device based on the interactive video call in order to prevent reverse-engineering credentials of the owner.

* * * * *